(12) United States Patent
Fukui et al.

(10) Patent No.: US 12,111,508 B2
(45) Date of Patent: Oct. 8, 2024

(54) PACKAGE FOR OPTICAL FIBER, PACKAGE PRODUCT, METHOD FOR EXTRACTING OPTICAL FIBER, AND JIG

(71) Applicant: SUMITOMO ELECTRIC OPTIFRONTIER CO., LTD., Yokohama (JP)

(72) Inventors: Junji Fukui, Yokohama (JP); Yoshikyo Tamekuni, Yokohama (JP); Takahiro Inaba, Yokohama (JP); Yoshihiro Takeyama, Yokohama (JP); Daizo Nishioka, Yokohama (JP); Hisahiko Narukawa, Komaki (JP); Yuji Matsumoto, Komaki (JP); Shinsuke Sato, Komaki (JP); Tuan Nghia Duong, Komaki (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 281 days.

(21) Appl. No.: 17/621,108

(22) PCT Filed: Apr. 16, 2021

(86) PCT No.: PCT/JP2021/015755
§ 371 (c)(1),
(2) Date: Dec. 20, 2021

(87) PCT Pub. No.: WO2022/064747
PCT Pub. Date: Mar. 31, 2022

(65) Prior Publication Data
US 2022/0350103 A1    Nov. 3, 2022

(30) Foreign Application Priority Data
Sep. 28, 2020   (JP) ................................. 2020-162361

(51) Int. Cl.
*G02B 6/44* (2006.01)
*G02B 6/38* (2006.01)

(52) U.S. Cl.
CPC ........... *G02B 6/4453* (2013.01); *G02B 6/387* (2013.01); *G02B 6/4457* (2013.01)

(58) Field of Classification Search
CPC ...... G02B 6/44; G02B 6/4453; G02B 6/4457; G02B 6/38; G02B 6/385
See application file for complete search history.

(56) References Cited

U.S. PATENT DOCUMENTS 5,263,585 A     11/1993   Lawhon et al.
2008/0048063 A1  2/2008   Wells et al.
(Continued)

FOREIGN PATENT DOCUMENTS

EP     2184821 A2    5/2010
JP    H04-035104 U   3/1992
(Continued)

*Primary Examiner* — Tina M Wong
(74) *Attorney, Agent, or Firm* — Oliff PLC

(57) ABSTRACT

A package for an optical fiber includes: a base portion; a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions; a mounting portion to which the connector of the optical fiber is to be mounted; and a plurality of fall-off preventing portions that are formed integrally with the base portion and capable of restricting a position of the optical fiber to be wound over the plurality of protruding portions.

43 Claims, 21 Drawing Sheets

(56) References Cited

U.S. PATENT DOCUMENTS

| | | | | |
|---|---|---|---|---|
| 2014/0161411 A1* | 6/2014 | Slater | ............... | G02B 6/4457 |
| | | | | 242/598.6 |
| 2015/0378122 A1* | 12/2015 | Simmons | ............ | G02B 6/4471 |
| | | | | 439/529 |
| 2016/0033733 A1* | 2/2016 | Burek | ............... | G02B 6/4457 |
| | | | | 385/135 |
| 2016/0242304 A1 | 8/2016 | Hsu et al. | | |
| 2016/0349472 A1* | 12/2016 | Clatanoff | ............. | G02B 6/444 |

FOREIGN PATENT DOCUMENTS

| | | |
|---|---|---|
| JP | H09-222519 A | 8/1997 |
| JP | H10-221539 A | 8/1998 |
| JP | 3175199 U | 4/2012 |
| JP | 2014-105021 A | 6/2014 |
| JP | 2015-025906 A | 2/2015 |

\* cited by examiner

PACKAGE FOR OPTICAL FIBER, PACKAGE PRODUCT, METHOD FOR EXTRACTING OPTICAL FIBER, AND JIG

TECHNICAL FIELD

The present invention relates to a package for an optical fiber, a package product, a method for extracting an optical fiber, and a jig.

The present application claims priority from Japanese Patent Application No. 2020-162361 filed on Sep. 28, 2020, contents of which are incorporated by reference in its entirety.

BACKGROUND ART

Patent Literature 1 and Patent Literature 2 disclose a storage case that stores an optical fiber. The storage case disclosed in Patent Literature 1 includes a main body, and a bobbin around which the optical fiber is wound. The bobbin is rotatably stored in the main body. The optical fiber wound around the bobbin is stored in a space surrounded by an inner peripheral wall of the main body and an upper flange and a lower flange of the bobbin.

The storage case disclosed in Patent Literature 2 includes a main body, a bobbin around which the optical fiber is wound, and an upper lid that covers the main body, the bobbin, and the optical fiber. The bobbin is rotatably stored in the main body. The optical fiber to be wound around the bobbin is stored in a space surrounded by an inner peripheral wall of the main body, the bobbin, and the upper lid. Patent Literature 2 further discloses stacking of a plurality of storage cases.

CITATION LIST

Patent Literature

Patent Literature 1: JP-A-2015-025906
Patent Literature 2: JP-A-2014-105021

SUMMARY OF INVENTION

Solution to Problem

A package for an optical fiber according to the present invention, the package including:
- a base portion;
- a plurality of protruding portions that protrude from a flat surface of the base portion, are arranged along an outer periphery of the base portion, and are configured such that an optical fiber including a connector mounted to at least one end thereof is wound along a part of an outer periphery of each of the protruding portions;
- a mounting portion to which the connector of the optical fiber is to be mounted; and
- a plurality of fall-off preventing portions that are formed integrally with the base portion and capable of restricting a position of the optical fiber to be wound over the plurality of protruding portions.

A package product according to the present invention including:
- an optical fiber including a connector mounted to at least one end thereof; and
- the package for an optical fiber, in which
- the optical fiber is stored in the package, and the connector is mounted to the mounting portion.

A method for extracting an optical fiber according to the present invention, which is a method for extracting an optical fiber including a connector mounted to at least one end thereof from a package around which the optical fiber is wound, the method including:
- extracting the connectors of the optical fibers respectively from a plurality of the packages, and attaching the plurality of packages from which the connectors are extracted to a rotatable jig; and
- pulling together the connectors extracted respectively from the plurality of packages attached to the jig or parts of the optical fibers connected to the connectors.

A jig according to the present invention, which is a jig used for extracting an optical fiber including a connector mounted to at least one end thereof from a package around which the optical fiber is wound, the jig including:
- a shaft portion to which the package is to be attached;
- a supporting portion that is provided at the shaft portion and includes a placement surface allowing placement of the package;
- a gripping portion that is grippable by a user and rotatably supports the shaft portion; and
- a contacting portion that is provided at an end portion of the shaft portion and includes a contact surface in contact with the gripping portion when the shaft portion is displaced in a rotation axis direction with respect to the gripping portion.

A method for extracting an optical fiber according to the present invention, which is a method for extracting, using the above jig, an optical fiber including a connector mounted to at least one end thereof from the above package for an optical fiber around which the optical fiber is wound, the method including:
- extracting the connectors of the optical fibers respectively from a plurality of the packages, and attaching the plurality of packages from which the connectors are extracted to the jig; and
- pulling together the connectors extracted respectively from the plurality of packages attached to the jig or parts of the optical fibers connected to the connectors.

DESCRIPTION OF EMBODIMENTS

Technical Problem

Figure 1:
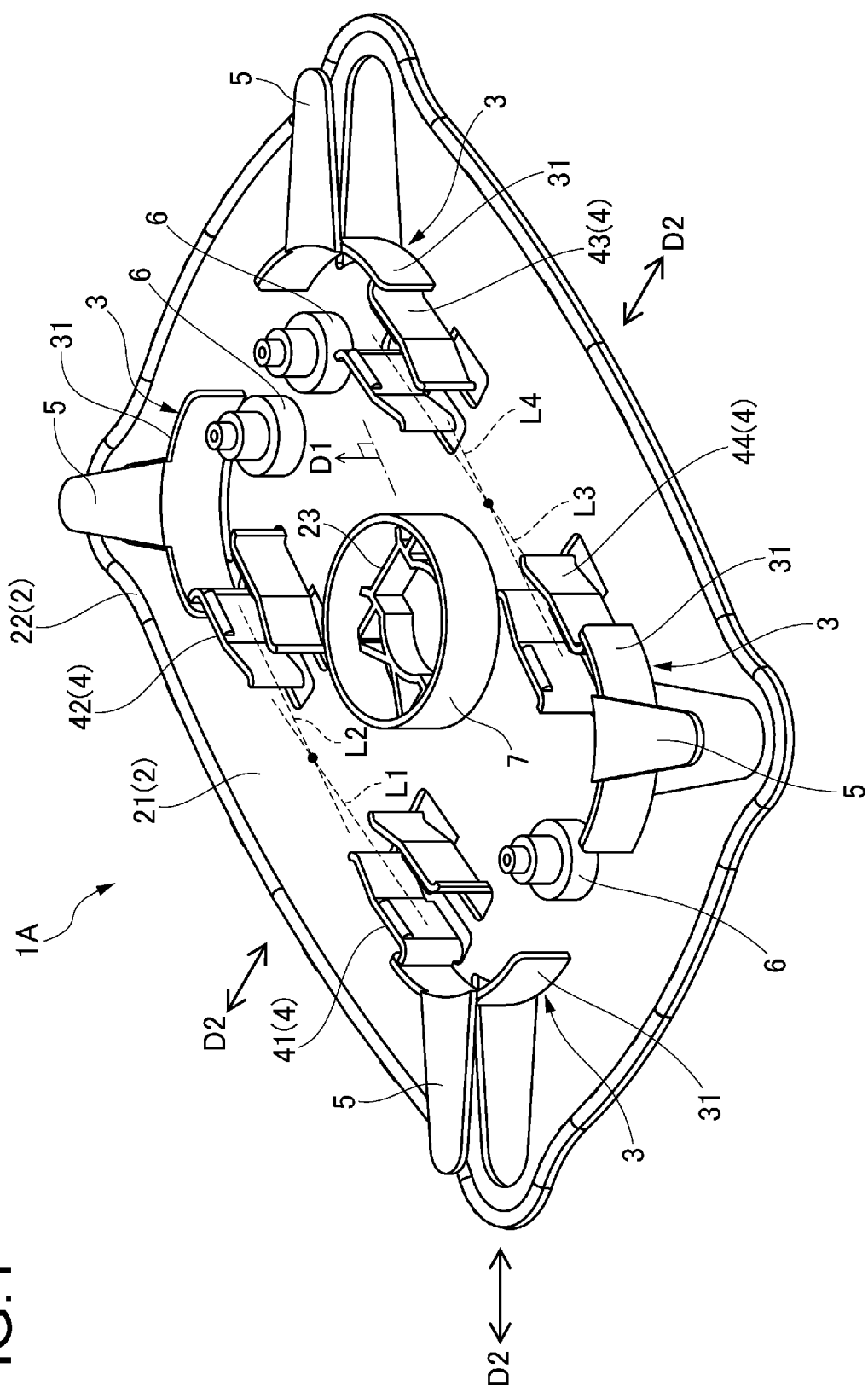
FIG. 1 is a perspective view of a package for an optical fiber according to a first embodiment of the present invention.

In both Patent Literature 1 and Patent Literature 2, by storing the optical fiber with a plurality of members, the optical fiber to be wound around the bobbin is prevented from extracting and falling off from the storage case. However, a storage case that prevents the optical fiber from falling off with a simpler structure is preferred.

An object of the present invention is to prevent an optical fiber from falling off with a simple structure.
Advantageous Effects of Invention According to the present invention, it is possible to prevent an optical fiber from falling off with a simple structure.

DESCRIPTION OF EMBODIMENTS OF INVENTION

First, contents of embodiments of the present invention will be listed and described.

(1) A package for an optical fiber according to an aspect of the present invention includes:
 a base portion;
 a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions;
 a mounting portion to which the connector of the optical fiber is to be mounted; and
 a plurality of fall-off preventing portions that are formed integrally with the base portion and capable of restricting a position of the optical fiber to be wound over the plurality of protruding portions.

According to the package in the present invention, since the fall-off preventing portions are formed integrally with the base portion, the package alone can prevent the optical fiber from falling off. Therefore, it is possible to provide a package having a simple structure as compared with a case where an optical fiber is prevented from falling off by using a plurality of members.

Further, since the package in the present invention includes the mounting portion to which the connector of the optical fiber is to be mounted, a winding state of the optical fiber can be stabilized. The expression "integrally formed" used in the present description means being formed of a single member (that is, having a monolithic structure).

(2) The mounting portion may protrude in a first direction from the flat surface of the base portion and include a pair of gripping portions are arranged to face each other in a second direction intersecting the first direction.

According to the present invention, the connector of the optical fiber is held in a state of being sandwiched between the pair of gripping portions in the second direction, and thus when the connector is extracted from the mounting portion, the connector can be extracted from the first direction or from a direction intersecting the first direction and the second direction.

(3) At least one gripping portion of the pair of gripping portions may include a convex portion at an end portion thereof in the first direction, and the convex portion protrudes toward the other gripping portion of the pair of gripping portions.

According to the present invention, for example, when the package vibrates due to an external force, the connector can be prevented from being extracted from the mounting portion in the first direction.

(4) Each of the pair of gripping portions may include a first end portion in a third direction intersecting the first direction and the second direction,
 each of the pair of gripping portions may include a non-connecting portion that is not connected to the base portion, and
 an interval between the non-connecting portions of the pair of gripping portions in the second direction may decrease toward the first end portions.

According to the present invention, since the connector can be sandwiched between the pair of non-connecting portions, the connector can be prevented from being extracted from the mounting portion in the second direction or the third direction, for example, when the package vibrates due to the external force. Further, the non-connecting portions are deformed, and thus the connector can be easily attached to the mounting portion, and the connector can be easily extracted from the mounting portion.

(5) Each of the pair of gripping portions may include a second end portion in the third direction intersecting the first direction and the second direction, and
 an interval between the gripping portions at the second end portions in the second direction may increase toward tips of the second end portions.

According to the present invention, when the connector is extracted from the mounting portion in the third direction, caps attached to a tip of the connector can be prevented from coming into contact with the second end portions of the gripping portions and falling off from the connector.

(6) A surface of the second end portion facing the other gripping portion may be curved when the gripping portion is viewed from a direction perpendicular to the flat surface of the base portion.

According to the present invention, even in a case where the cap of the connector comes into contact with the second end portion when the connector is extracted from the mounting portion in the third direction, the cap can be guided along the curved surface.

(7) A plurality of connecting portions that protrude from the flat surface of the base portion may be provided, and the connecting portion may include a convex portion at a front end portion in a direction in which the connecting portion protrudes, and may have a concave portion recessed forward from a rear surface at a rear end portion in the direction in which the connecting portion protrudes.

According to the present invention, when a plurality of packages are stacked on each other in the direction perpendicular to the flat surface of the base portion, the plurality of packages can be connected by fitting a concave portion of a connecting portion of one package to a convex portion of a connecting portion of the other package.

(8) The connecting portion may include a plurality of ribs provided in the concave portion.

According to the present invention, by bringing the convex portion of the connecting portion of the other package into contact with the ribs provided in the concave portion of the connecting portion of the one package, the convex portion of the other connecting portion can be easily inserted into the concave portion of the one connecting portion, and the convex portion of the other connecting portion can be easily extracted from the concave portion of the one connecting portion.

(9) The connecting portions may include three connecting portions, and the connecting portions may be arranged at positions corresponding to vertices of a triangle including a center of the base portion therein when viewed from the direction perpendicular to the flat surface of the base portion.

According to the present invention, when winding the optical fiber around the package, an operator can determine a winding direction of the optical fiber with reference to the arrangement of the connecting portions. Accordingly, the winding directions of the optical fibers can be made the same in the plurality of packages, and thus when the optical fibers are extracted simultaneously from the plurality of packages, extraction directions of the optical fibers are reversed, and the optical fibers can be prevented from being entangled with each other. Further, when the operator extracts the optical fiber from the package, the arrangement of the connecting portions makes it easy to visually and easily recognize the connector to be extracted from the mounting portion first, and thus the work efficiency is improved. Further, the three connecting portions are provided, and thus when the plurality of packages are stacked on each other, it is easy to maintain the horizontality of each package.

(10) A central protruding portion that protrudes from the flat surface of the base portion, is disposed closer to the center of the base portion than the plurality of protruding portions, and is configured so that a remaining portion of the optical fiber wound around the plurality of protruding portions is wound along a part of an outer periphery of the central protruding portion, and a first extending portion that extends from the central protruding portion in a direction along the flat surface of the base portion may be provided.

According to the present invention, since the remaining portion of the optical fiber wound around the plurality of protruding portions can be wound around the central protruding portion, an extra length of the optical fiber can be easily adjusted. Further, a position of the optical fiber in the direction perpendicular to the flat surface of the base portion can be restricted by the first extending portion.

(11) The fall-off preventing portion may include a second extending portion extending in the direction along the flat surface of the base portion.

According to the present invention, the position of the optical fiber in the direction perpendicular to the flat surface of the base portion can be restricted.

(12) The optical fiber may include a first connector and a second connector at respective end portions thereof. The mounting portion may include a first mounting portion to which the first connector is mountable and a second mounting portion to which the second connector is mountable. A first axis, which is a longitudinal direction of the first connector to be mounted to the first mounting portion, and a second axis, which is a longitudinal direction of the second connector to be mounted to the second mounting portion, may intersect each other when viewed from the direction perpendicular to the flat surface of the base portion.

In general, when the operator extracts the optical fiber stored in the package from the package as necessary, it may be difficult to distinguish which connector among the two connectors of the optical fiber should be extracted from the mounting portion to easily extract the optical fiber. However, according to the present invention, the first axis, which is the longitudinal direction of the first connector to be mounted to the first mounting portion, and the second axis, which is the longitudinal direction of the second connector to be mounted to the second mounting portion, intersect each other in a plan view of the base portion (when viewed from the direction perpendicular to the flat surface of the base portion). Therefore, the optical fiber to be connected to one of the first connector and the second connector is disposed to intersect over the optical fiber to be connected to the other connector. When the operator extracts the optical fiber from the package, it is easy to visually and easily recognize that one optical fiber located on an upper side is to be first extracted among the optical fibers in an intersecting state, and thus the work efficiency is improved.

(13) The mounting portion may further include a third mounting portion to which the first connector is moutable and a fourth mounting portion to which the second connector is moutable. The third axis, which is the longitudinal direction of the first connector to be mounted to the third mounting portion, and the fourth axis, which is the longitudinal direction of the second connector to be mounted to the fourth mounting portion, may intersect each other when viewed from the direction perpendicular to the flat surface of the base portion.

According to the present invention, for example, when the first connector is mounted to the first mounting portion, and the optical fiber connected to the first connector is wound around the package, the second connector can be mounted to either the second mounting portion or the fourth mounting portion according to an extra length of the optical fiber. Accordingly, the extra length of the optical fiber can be easily adjusted.

(14) The base portion, the protruding portions, the mounting portion, and the fall-off preventing portions may be integrally formed.

According to the present invention, since the protruding portions, the mounting portion, and the fall-off preventing portions are formed integrally with the base portion, the optical fiber with the connector can be stored by a simple package alone.

(15) The base portion, the protruding portions, the mounting portion, the fall-off preventing portions, and the connecting portions may be integrally formed.

According to the present invention, since the protruding portions, the mounting portion, the fall-off preventing portions, and the connecting portions are formed integrally with the base portion, the optical fiber with the connector can be stored by a simple package alone.

(16) A non-circular hole may be formed near the center of the base portion.

According to the present invention, the non-circular hole is formed near the center of the base portion, and thus when the plurality of packages are stacked on each other, a rod-shaped jig can be inserted into the holes formed respectively in the plurality of packages.

The operator can easily extract the optical fibers from the packages by rotating the packages together with the jig. Further, since the hole has a non-circular shape, the plurality of stacked packages can be prevented from individually rotating. That is, the operator can rotate the plurality of packages simultaneously at the same cycle.

(17) The fall-off preventing portion may restrict a position of the optical fiber in the direction perpendicular to the flat surface of the base portion, and in a direction perpendicular to a longitudinal direction of the optical fiber to be wound over the plurality of protruding portions and the direction perpendicular to the flat surface of the base portion.

According to the present invention, the fall-off preventing portion can prevent the optical fiber from falling off from the package by restricting the position of the optical fiber in two directions. Since the falling-off of the optical fiber can be prevented by the fall-off preventing portion alone, it is possible to provide the package having a simple structure as compared with the case where the optical fiber is prevented from falling off by using the plurality of members.

(18) The fall-off preventing portion may be disposed between the protruding portions adjacent to each other in the longitudinal direction of the optical fiber.

According to the present invention, since the fall-off preventing portion is disposed between the adjacent protruding portions, the fall-off preventing portion can prevent the optical fiber wound from one of the adjacent protruding portions to the other protruding portion from falling off.

(19) The fall-off preventing portion may include an outer peripheral piece located near the outer periphery of the base portion, an inner peripheral piece located closer to the center of the base portion than the outer peripheral piece, and a continuous portion connecting the outer peripheral piece and the inner peripheral piece. The fall-off preventing portion may be configured to hold the optical fiber in a space surrounded by the inner peripheral piece, the continuous portion, and the outer peripheral piece. The inner peripheral piece may be connected to the base portion, and the outer peripheral piece may not be connected to the base portion.

According to the present invention, since the fall-off preventing portion holds the optical fiber to be wound around the protruding portion in the space surrounded by the inner peripheral piece, the continuous portion, and the outer peripheral piece of the fall-off preventing portion, the fall-off preventing portion can prevent the optical fiber from being extracted from the package. Further, the outer peripheral piece located near the outer periphery of the base portion is not connected to the base portion. Therefore, by passing the optical fiber held in the space from a portion where the base portion and the outer peripheral piece are not connected, the optical fiber can be easily drawn out as necessary.

(20) The inner peripheral piece may be inclined with respect to the flat surface of the base portion.

According to the present invention, since the inner peripheral piece is inclined with respect to the flat surface of the base portion, the optical fiber to be wound around the plurality of protruding portions can be appropriately guided to the space surrounded by the inner peripheral piece, the continuous portion, and the outer peripheral piece along the inner peripheral piece.

(21) A length of the outer peripheral piece in the direction perpendicular to the longitudinal direction of the optical fiber to be wound over the plurality of protruding portions and the direction perpendicular to the flat surface of the base portion may be shorter than a length of the inner peripheral piece connected to the base portion.

According to the present invention, the optical fiber held in the space is moved in the direction perpendicular to the longitudinal direction of the optical fiber to be wound over the plurality of protruding portions and the direction perpendicular to the flat surface of the base portion, and thus the optical fiber can be easily drawn out.

(22) The protruding portion may include an outer peripheral surface located near the outer periphery of the base portion, and an inner peripheral surface located closer to the center of the base portion than the outer peripheral surface. The inner peripheral surface may be perpendicular to the flat surface of the base portion. The outer peripheral surface may be inclined with respect to the flat surface of the base portion.

When the plurality of packages are stacked on each other in the direction perpendicular to the flat surface of the base portion, a protruding portion of the other package is fitted into a bottom portion of the one package. According to the present invention, the inner peripheral surface is perpendicular to the flat surface of the base portion, and the outer peripheral surface is inclined with respect to the flat surface of the base portion, and thus the protruding portion of the other package is easily guided to the bottom portion of the one package while maintaining the horizontality of each package. Further, since the outer peripheral surface is inclined with respect to the flat surface of the base portion, a contact area between the bottom portion of the one package and an outer peripheral surface of the protruding portion of the other package is larger than that in a case where the outer peripheral surface is perpendicular to the flat surface of the base portion. Therefore, as compared with the case where the outer peripheral surface is perpendicular to the flat surface of the base portion, the two packages once fitted are less likely to be extracted from each other, and the operator can easily handle the plurality of packages.

(23) A package product according to an aspect of the present invention includes:

an optical fiber including a connector mounted to at least one end thereof; and the package for an optical fiber, and the optical fiber may be stored in the package, and the connector may be mounted to the mounting portion.

The present invention provides an optical fiber stored in a single package, and the optical fiber can be easily extracted from the package.

(24) The optical fiber may include a first connector and a second connector at respective end portions thereof. The mounting portion may include the first mounting portion to which the first connector is mountable and the second mounting portion to which the second connector is mountable. A boot of the first connector mounted to the first mounting portion and a boot of the second connector mounted to the second mounting portion may intersect each other when viewed from the direction perpendicular to the flat surface of the base portion.

According to the present invention, the boot of the first connector and the boot of the second connector intersect each other in the plan view of the base portion, and thus when the operator extracts the optical fiber from the package, it is easy to visually and easily recognize that the connector corresponding to one boot located on an upper side is first extracted from the mounting portion among the two boots in an intersecting state.

Therefore, the work efficiency is improved.

(25) A method for extracting an optical fiber according to an aspect of the present invention is a method for extracting an optical fiber including a connector mounted to at least one end thereof from a package around which the optical fiber is wound, and the method includes:

extracting the connectors of the optical fibers respectively from a plurality of the packages, and attaching the plurality of packages from which the connectors are extracted to a rotatable jig; and pulling together the connectors extracted respectively from the plurality of packages attached to the jig or parts of the optical fibers connected to the connectors.

According to the present invention, since the packages rotate together with the jig when the connectors or the parts of the optical fibers are pulled, the optical fibers can be easily extracted from the packages. Further, the optical fibers can be extracted together from the plurality of packages by a single pulling operation.

(26) A jig according to an aspect of the present invention is a jig used for extracting an optical fiber including a connector mounted to at least one end thereof from a package around which the optical fiber is wound, and the jig includes:

a shaft portion to which the package is to be attached;

a supporting portion that is provided at the shaft portion and includes a placement surface allowing placement of the package;

a gripping portion that is grippable by a user and rotatably supports the shaft portion; and a contacting portion that is provided at an end portion of the shaft portion and includes a contact surface in contact with the gripping portion when the shaft portion is displaced in a rotation axis direction with respect to the gripping portion.

According to the present invention, since the package rotates together with the shaft portion when the connector or a part of the optical fiber extracted from the package is pulled, the optical fiber can be easily extracted from the package. Further, since the displacement of the shaft portion in the rotation axis direction with respect to the gripping portion can be restricted, the shaft portion can be prevented from being extracted from the gripping portion.

(27) A method for extracting an optical fiber according to an aspect of the present invention is a method for extracting, using the jig according to (26), an optical fiber including a connector mounted to at least one end thereof from the package for an optical fiber according to any one of (1) to (22) around which the optical fiber is wound, the method includes:

extracting the connectors of the optical fibers respectively from a plurality of the packages, and attaching the plurality of packages from which the connectors are extracted to the jig; and pulling together the connectors extracted respectively from the plurality of packages attached to the jig or parts of the optical fibers connected to the connectors.

According to the present invention, since the packages rotate together with the jig when the connectors or the parts of the optical fibers are pulled, the optical fibers can be easily extracted from the packages. Further, the optical fibers can be extracted together from the plurality of packages by a single pulling operation.

DETAILS OF EMBODIMENTS OF INVENTION

Hereinafter, embodiments of the present invention will be described in detail with reference to the accompanying drawings. Dimensions of respective members shown in the drawings may be different from actual dimensions of the respective members for convenience of explanation. The present invention is not limited to these examples, and is defined by the scope of the claims, and is intended to include all modifications within the scope and meaning equivalent to the scope of the claims.

(First Embodiment)

Figure 2:
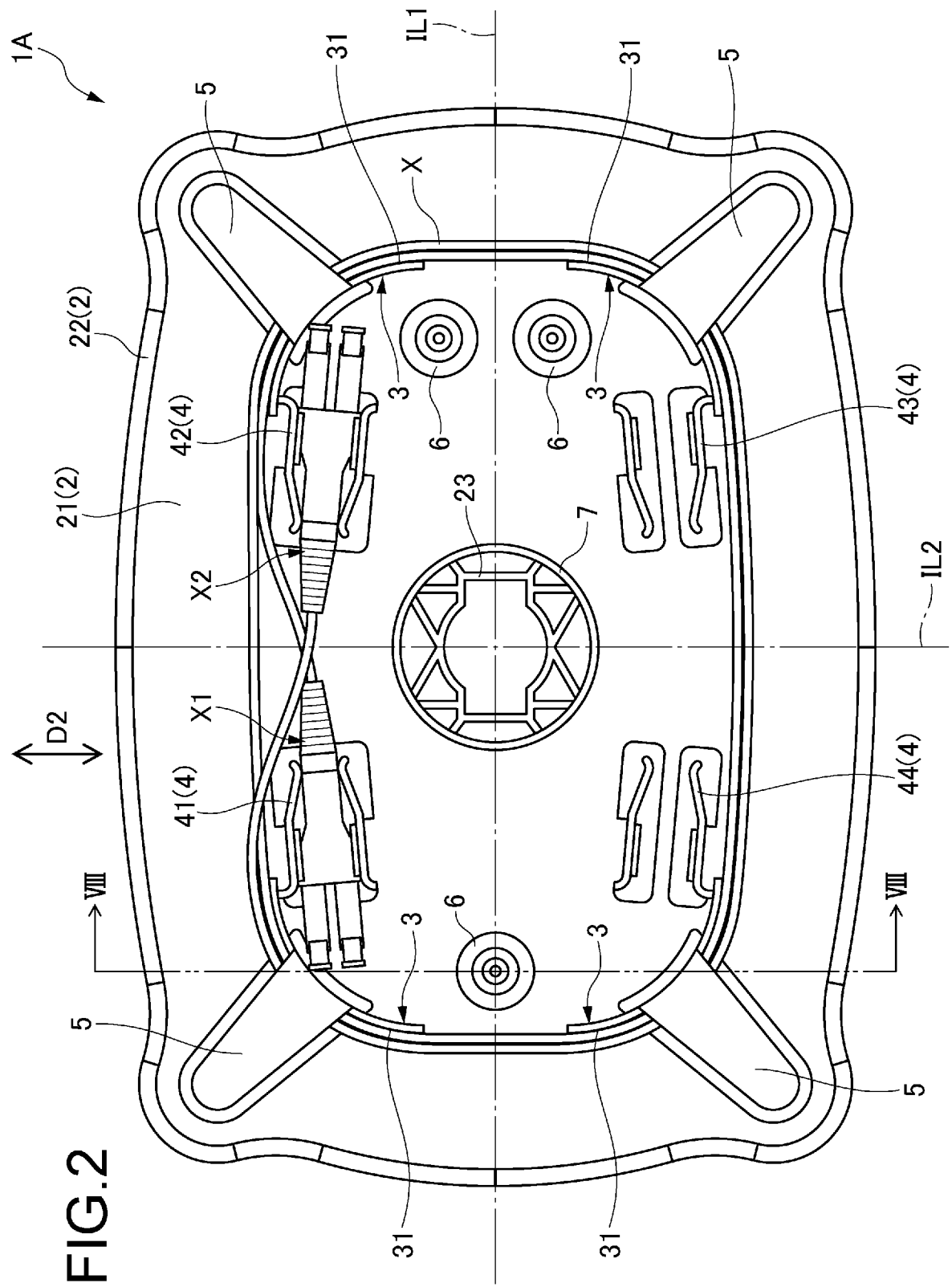
FIG. 2 is a plan view illustrating a state in which the optical fiber is wound around the package.

FIG. 1 is a perspective view of a package 1A for an optical fiber X with a connector according to an embodiment of the present invention. FIG. 2 is a plan view illustrating a state (an example of a package product) in which the optical fiber X is wound around the package 1A. As shown in FIG. 2, the package 1A is configured so that the optical fiber X including the connector mounted to at least one end thereof is wound and stored. In this example, the optical fiber X is an optical fiber with a connector including a first connector X1 and a second connector X2 at respective end portions of the optical fiber. The first connector X1 and the second connector X2 in this example have the same shape, but may have different shapes.

As shown in FIGS. 1 and 2, the package 1A includes a base portion 2, a plurality of protruding portions 3, a mounting portion 4, and a plurality of fall-off preventing portions 5. In this example, an arrow D1 indicates a direction (hereinafter, referred to as a direction D1) perpendicular to a flat surface 21 of the base portion 2. An arrow D2 indicates a direction (hereinafter, referred to as a direction D2) perpendicular to a longitudinal direction of the optical fiber X to be wound over the plurality of protruding portions 3 and the direction D1.

The base portion 2 is a flat plate as a base of the package 1A, and includes the flat surface 21 and an outer periphery 22. A thickness of the base portion 2 is, for example, 1.0 mm to 3.0 mm. A material of the base portion 2 is, for example, a synthetic resin such as polypropylene. In a plan view of the base portion 2, a shape of the base portion 2 is preferably an elliptical shape or a quadrangular shape with rounded corners, but may be a circular shape, a square shape, a rectangular shape, or a polygonal shape. A guide wall 23 is formed near a center of the base portion 2. A hole is formed inside the guide wall 23. The hole has a non-circular shape in the plan view of the base portion 2, and penetrates the base portion 2.

The plurality of protruding portions 3 protrude from the flat surface 21 of the base portion 2, and are arranged along the outer periphery 22 of the base portion. The optical fiber X is wound over the plurality of protruding portions 3 on the flat surface 21 along a part of an outer periphery of each of protruding portions 3 (FIG. 2). In this example, four protruding portions 3 are arranged apart from each other on the flat surface 21. The optical fiber X is wound in an elliptical shape. In a case of winding in an elliptical shape, a winding tension is applied more in a long side direction than in a short side direction, and thus unwinding is less likely to occur than in a case of winding in a circular shape. The plurality of protruding portions 3 may be formed integrally with the base portion 2. For example, the plurality of protruding portions 3 may be molded together with the base portion 2 by injection molding a synthetic resin such as polypropylene using a mold. An outer peripheral surface 31 of the protruding portion 3 may have an arc shape in the plan view of the base portion 2.

The outer peripheral surface 31 may be perpendicular to the flat surface 21 of the base portion 2. Further, although four protruding portions 3 are formed on the package 1A, the number of protruding portions 3 is not limited to four. The package 1A may include a plurality of protruding portions 3 according to an allowable radius of curvature of the optical fiber X.

The mounting portion 4 is configured to mount the first connector X1 and the second connector X2 of the optical fiber X (FIG. 2). The mounting portion 4 may be formed integrally with the base portion 2. For example, the mounting portion 4 may be molded together with the base portion 2 and the plurality of protruding portions 3 by injection molding a synthetic resin such as polypropylene using a mold. The mounting portion 4 includes a first mounting portion 41 and a second mounting portion 42. The first mounting portion 41 is configured to mount the first connector X1 of the optical fiber X to be wound over the plurality of protruding portions 3. The second mounting portion 42 is configured to mount the second connector X2 of the optical fiber X to be wound over the plurality of protruding portions 3. In this example, the first mounting portion 41 and the second mounting portion 42 are arranged in one of two regions divided by a line IL1 passing through the center of the base portion 2 and extending in a longitudinal direction of the base portion 2.

As shown in FIG. 1, a first axis L1, which is a longitudinal direction of the first connector X1 to be mounted to the first mounting portion 41, and a second axis L2, which is a longitudinal direction of the second connector X2 to be mounted to the second mounting portion 42, intersect each other in the plan view of the base portion 2.

Figure 3:
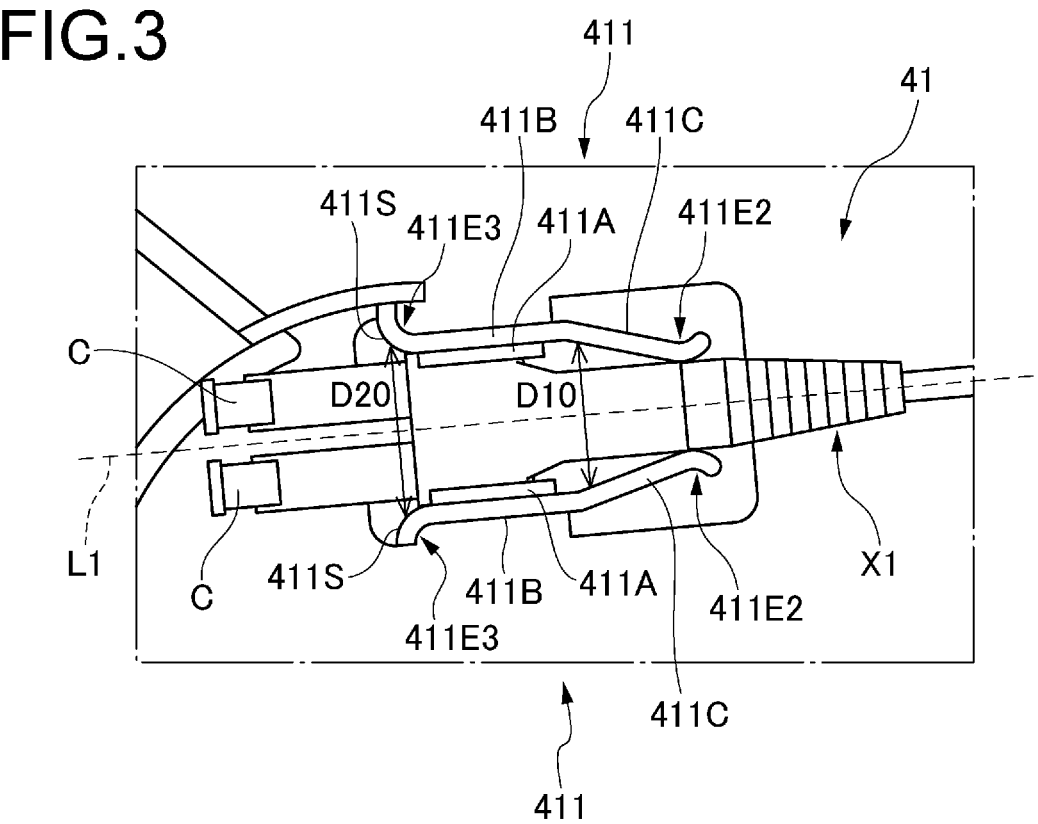
FIG. 3 is an enlarged schematic view of a mounting portion of the package shown in FIG. 2.
Figure 4:
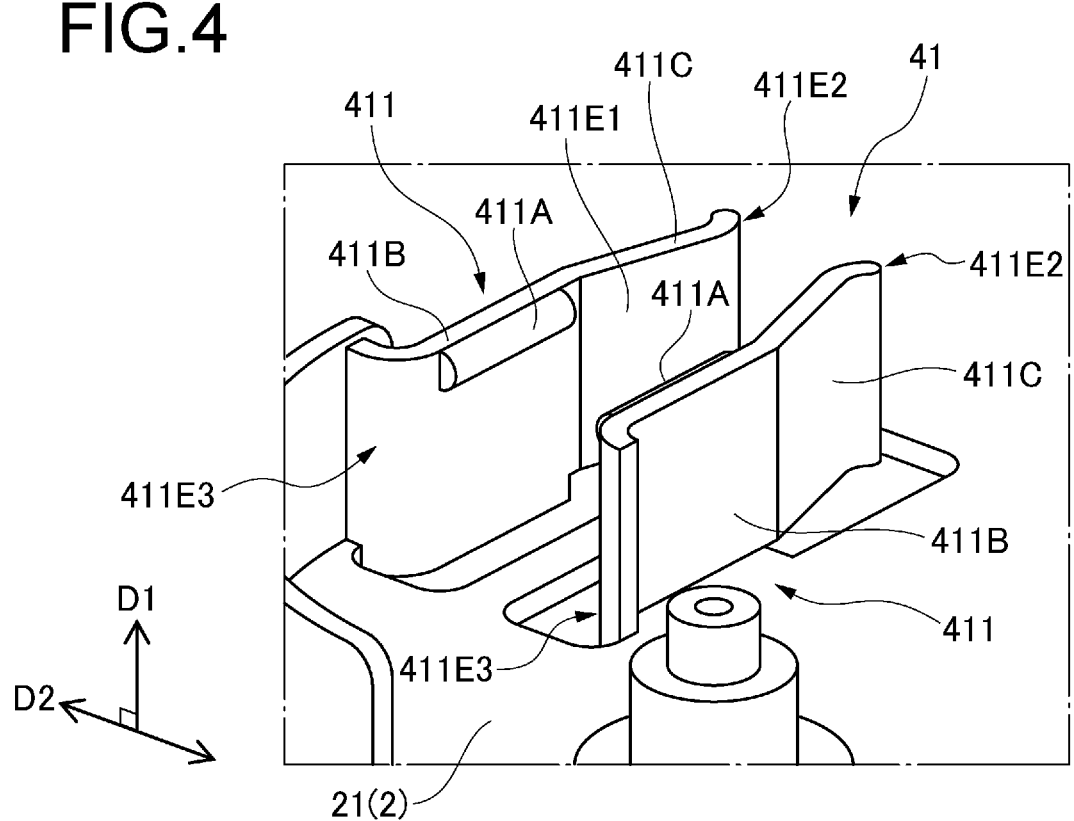
FIG. 4 is an enlarged schematic view of the mounting portion of the package shown in FIG. 1.

A specific configuration of the first mounting portion 41 will be described with reference to FIGS. 3 and 4. Since the second mounting portion 42 has the same configuration as the first mounting portion 41, the description thereof will be omitted. As shown in FIG. 3, the first mounting portion 41 is formed to engage with the first connector X1. Specifically, the first mounting portion 41 includes a pair of gripping portions 411. As shown in FIG. 4, the pair of gripping portions 411 protrude from the flat surface 21 of the base portion 2 in the direction D1 perpendicular to the flat surface 21 of the base portion 2. The pair of gripping portions 411 are arranged to face each other in the direction D2 perpendicular to the direction D1 perpendicular to the flat surface 21 of the base portion 2. In other words, the first connector X1 is held in a state of being sandwiched between the pair of gripping portions 411 in the direction D2. The direction D1 is an example of the first direction. The direction D2 is an example of the second direction.

As shown in FIG. 4, the gripping portion 411 includes, at a front end portion 411E1 (an example of the end portion) in the direction in which the gripping portion 411 protrudes from the flat surface 21 of the base portion 2, a convex portion 411A protruding toward the other gripping portion 411 facing the gripping portion 411. In this example, both of the pair of gripping portions 411 have the convex portion 411A, but one of the pair of gripping portions 411 may alone have the convex portion 411A.

The gripping portion 411 extends in a direction along the first axis L1, which is the longitudinal direction of the first connector X1, and includes a first end portion 411E2 and a second end portion 411E3 in the direction. The direction along the first axis L1 is an example of the third direction.

The gripping portion 411 includes a connecting portion 411B connected to the base portion 2 and a non-connecting portion 411C not connected to the base portion 2. In the plan view shown in FIG. 3, a hole is provided in the base portion 2 in a region where the non-connecting portion 411C is provided. An interval D10 between the non-connecting portions 411C of the pair of gripping portions 411 in the direction D2 decreases toward the first end portions 411E2.

An interval D20 between the gripping portions 411 at the second end portions 411E3 in the direction D2 increases toward tips of the second end portions 411E3. In this example, in the second end portion 411E3 of the gripping portion 411, a surface 411S facing the other gripping portion 411 is curved in the plan view of the base portion 2 (FIG. 3).

Figure 5:
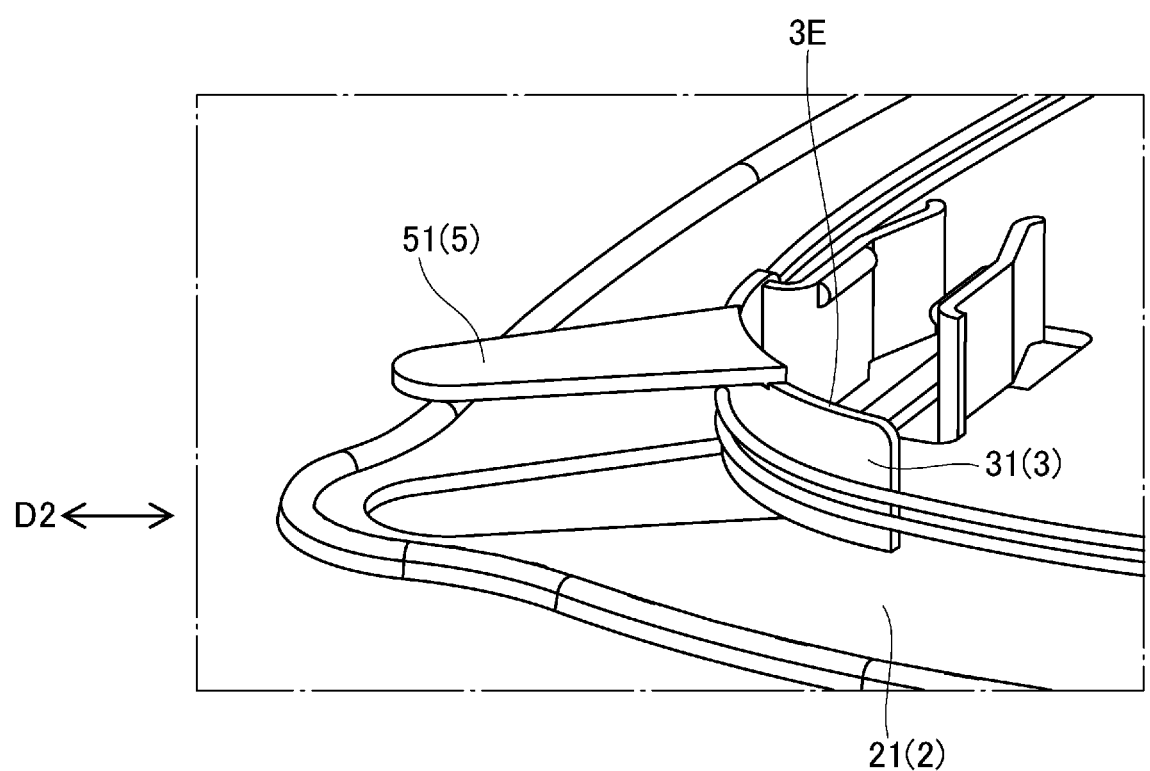
FIG. 5 is an enlarged schematic view of a fall-off preventing portion of the package shown in FIG. 1.

As shown in FIG. 5, the fall-off preventing portion 5 is formed integrally with the base portion 2. The fall-off preventing portion 5 is configured to restrict a position of the optical fiber X to be wound over the plurality of protruding portions 3. Specifically, the fall-off preventing portion 5 is configured to restrict a position of the optical fiber X in the direction D1 perpendicular to the flat surface 21 of the base portion 2. The fall-off preventing portion 5 includes an extending portion 51 extending in a direction along the flat surface 21 of the base portion 2. In this example, the fall-off preventing portion 5 is formed integrally with the protruding portion 3, and extends in the direction D2 from a front end 3E of the protruding portion 3 in the direction in which the protruding portion 3 protrudes from the flat surface 21 of the base portion 2. For example, a length of the extending portion 51 may be appropriately set to a dimension so that the optical fiber X wound around the plurality of protruding portions 3 is covered by the extending portion 51 in the plan view of the base portion 2.

Referring back to FIG. 1, the package 1A includes a plurality of connecting portions 6 protruding from the flat surface 21 of the base portion 2. The plurality of connecting portions 6 may be formed integrally with the base portion 2. For example, the plurality of connecting portions 6 may be molded together with the base portion 2, the plurality of protruding portions 3, the mounting portion 4, and the plurality of fall-off preventing portions 5 by injection molding a synthetic resin such as polypropylene using a mold.

As shown in FIG. 2, three connecting portions 6 are arranged on the package 1A as the plurality of connecting portions. The three connecting portions 6 are arranged at positions corresponding to vertices of a triangle including the center of the base portion 2 in the plan view of the base portion 2. For example, the three connecting portions 6 may be arranged at vertices of a triangle symmetrical with respect to a line passing through the center of the base portion 2. Alternatively, the three connecting portions 6 may be arranged so that the center of gravity of a triangle is located at the center of the base portion 2. In this example, the three connecting portions 6 are arranged to be symmetrical with respect to the line IL1 passing through the center of the base portion 2 and extending in the longitudinal direction of the base portion 2, and to be asymmetrical with respect to a line IL2 passing through the center of the base portion 2 and extending in a lateral direction of the base portion 2. When four or more connecting portions 6 are arranged on the package 1A, at least three connecting portions 6 are arranged at positions corresponding to vertices of a triangle including the center of the base portion 2.

Figure 6:
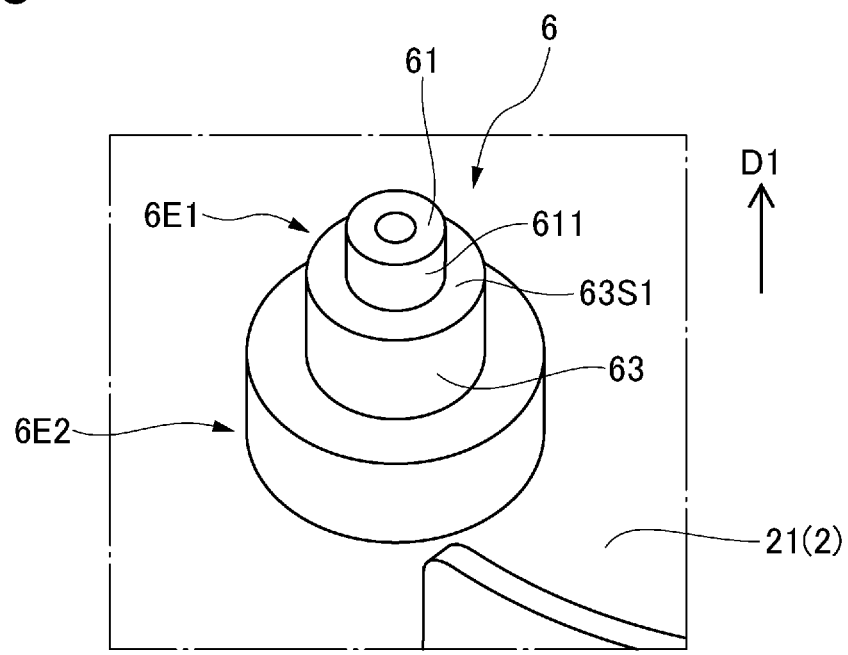
FIG. 6 is an enlarged schematic view of a connecting portion of the package shown in FIG. 1.
Figure 7:
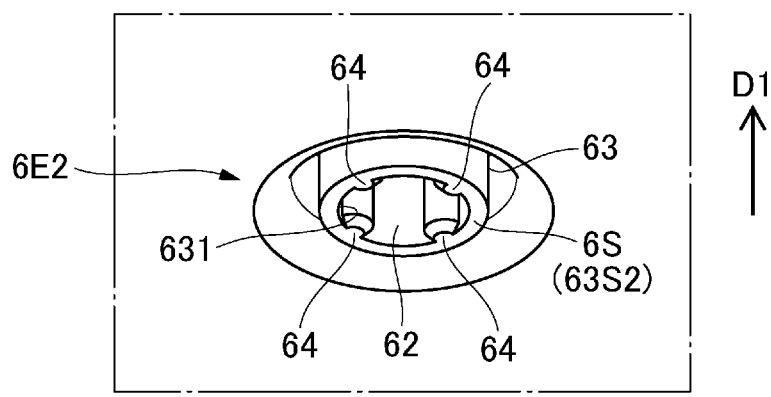
FIG. 7 is a rear perspective view of the connecting portion of the package shown in FIG. 6.
Figure 8:
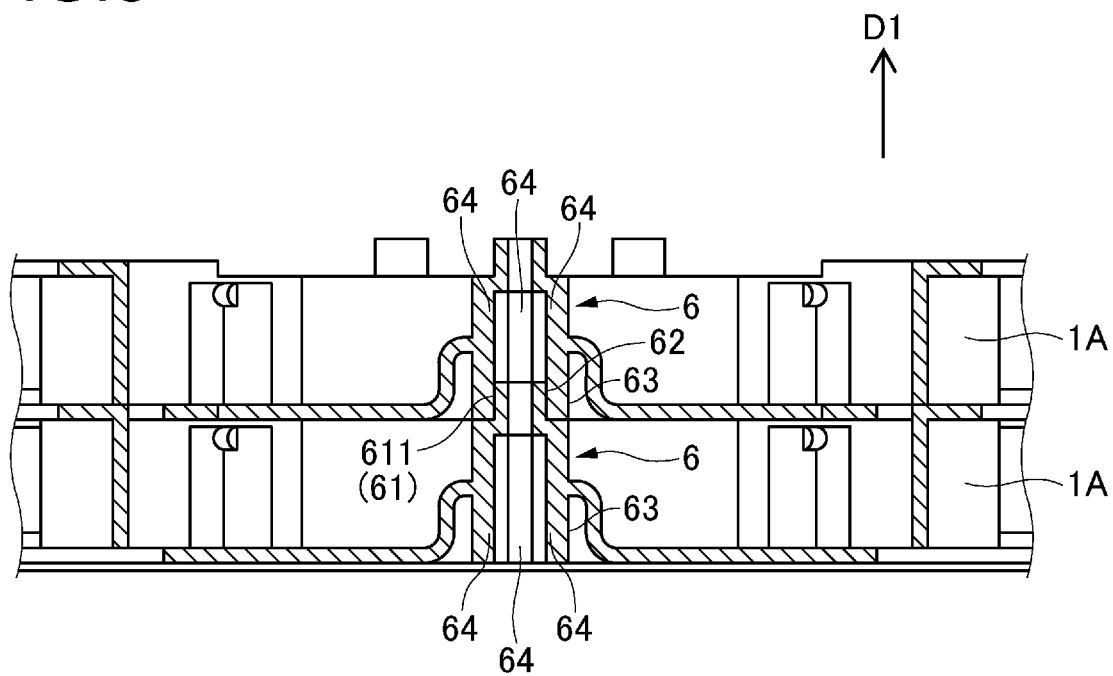
FIG. 8 is a cross-sectional view illustrating a state in which a plurality of packages are stacked.

As shown in FIG. 6, the connecting portion 6 includes a convex portion 61 at a front end portion 6E1 in a direction in which the connecting portion 6 protrudes from the flat surface 21 of the base portion 2. Further, as shown in FIG. 7, the connecting portion 6 includes a concave portion 62 recessed forward from a rear surface 6S at a rear end portion 6E2 in the direction in which the connecting portion 6 protrudes from the flat surface 21 of the base portion 2. As shown in FIG. 8, when a plurality of packages 1A are stacked on each other in the direction D1 perpendicular to the flat surface 21 of the base portion 2, the concave portion 62 formed on the rear end portion 6E2 of the connecting portion 6 of the upper package 1A is fitted to the convex portion 61 formed on the front end portion 6E1 of the corresponding connecting portion 6 of the lower package 1A. Accordingly, the connecting portion 6 of the upper package 1A and the corresponding connecting portion 6 of the lower package 1A are connected to each other.

In this example, the connecting portion 6 includes a projecting portion 63 having a columnar shape extending in the direction D1 perpendicular to the flat surface 21 of the base portion 2, and the convex portion 61 protrudes in the direction D1 from a front end surface 63S1 of the projecting portion 63 (FIG. 6). Further, a through hole extending in an axial direction (the direction D1) is formed inside the projecting portion 63, and the concave portion 62 is formed by a part of an inner peripheral surface 631 of the projecting portion 63 formed by the through hole (FIG. 7). A shape of the projecting portion 63 is not limited to a columnar shape or a quadrangular prism shape. The inner peripheral surface 631 (FIG. 7) of the projecting portion 63 of the connecting portion 6 of the upper package 1A is in contact with an outer peripheral surface 611 (FIG. 6) of the convex portion 61 of the connecting portion of the lower package 1A, and a rear end surface 63S2 (FIG. 7) of the projecting portion 63 of the connecting portion 6 of the upper package 1A is in contact with the front end portion 6E1 (FIG. 6) of the projecting portion 63 of the connecting portion of the lower package 1A.

As shown in FIG. 7, the connecting portion 6 may include a plurality of ribs 64 provided in the concave portion 62. In this example, four ribs 64 arranged apart from each other in a circumferential direction are provided on the inner peripheral surface 631 of the projecting portion 63 to protrude in a manner of approaching each other. Further, the rib 64 extends in the direction D1 on the inner peripheral surface 631 of the projecting portion 63. As shown in FIG. 8, when the plurality of packages 1A are stacked on each other, the outer peripheral surface 611 of the convex portion 61 of the connecting portion of the lower package 1A is in contact with the plurality of ribs 64 provided on the inner peripheral surface 631 of the projecting portion 63 of the connecting portion 6 of the upper package 1A. The ribs 64 may be provided not over the entire length of the inner peripheral surface 631 of the projecting portion 63 but only on a region with which the convex portion 61 of the connecting portion 6 of another package 1A to be connected is in contact. Further, the outer peripheral surface 611 of the convex portion 61 and a surface of the rib 64 in contact with the outer peripheral surface 611 may be formed in a tapered shape that is inclined with respect to the direction D1 perpendicular to the flat surface 21 of the base portion 2.

Referring back to FIG. 1, the package 1A may include a central protruding portion 7 protruding from the flat surface 21 of the base portion 2 and disposed closer to the center of the base portion 2 than the plurality of protruding portions 3. A remaining portion of the optical fiber X wound around the plurality of protruding portions 3 is wound around an outer periphery of the central protruding portion 7. In this example, the central protruding portion 7 is formed to surround the guide wall 23. The central protruding portion 7 may be formed integrally with the base portion 2. For example, the central protruding portion 7 may be molded together with the base portion 2, the plurality of protruding portions 3, the mounting portion 4, the plurality of fall-off preventing portions 5, and the plurality of connecting portions 6 by injection molding a synthetic resin such as polypropylene using a mold.

Figure 9:
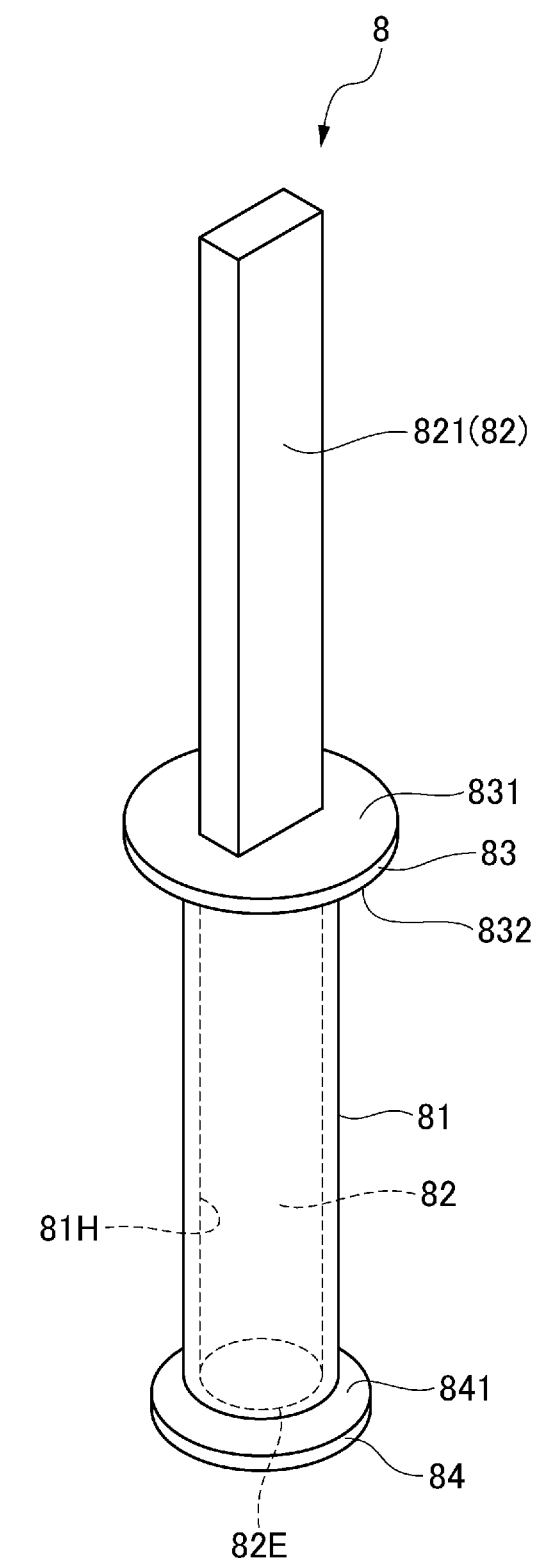
FIG. 9 is a perspective view of a multi-stacking jig used for extracting the optical fiber from the package.

Next, a method for extracting the optical fiber X from the package 1A using the multi-stacking jig 8 will be described with reference to FIGS. 9 to 11. As shown in FIG. 9, the multi-stacking jig 8 to which the package 1A is to be attached includes a gripping portion 81, a shaft portion 82, a supporting portion 83, and a contacting portion 84.

The gripping portion 81 is grippable by an operator and rotatably supports the shaft portion 82. In this example, the gripping portion 81 has a columnar shape, and a through hole 81H extending in the axial direction is formed inside the gripping portion 81. The shaft portion 82 has a bar shape, and a part of the shaft portion 82 is inserted into the through hole 81H of the gripping portion 81. In this example, the part of the shaft portion 82 inserted into the through hole 81H has a columnar shape. That is, the shaft portion 82 is connected to the gripping portion 81 in a rotatable manner about the axial direction. A shape of the gripping portion 81 is not limited to a columnar shape or a quadrangular prism shape.

The shaft portion 82 includes an inserting portion 821 to which the package 1A is to be attached. The inserting portion 821 is formed to be fitted into the hole of the guide wall 23 of the package 1A. In this example, the inserting portion 821 has a quadrangular prism shape extending in the axial direction. The package 1A is attached to the shaft portion 82 by inserting the inserting portion 821 into the hole of the guide wall 23 of the package 1A. A shape of the inserting portion 821 of the shaft portion 82 is not limited to a columnar shape or a quadrangular prism shape.

The supporting portion 83 supports the package 1A attached to the shaft portion 82. Specifically, the supporting portion 83 is provided at the shaft portion 82, and includes a placement surface 831 that allows placement of the package 1A. The package 1A guided to the inserting portion 821 via the guide wall 23 is placed on the placement surface 831 (FIG. 10). A surface 832 of the supporting portion 83 opposite to the placement surface 831 functions as a contact surface in contact with the gripping portion 81 when the shaft portion 82 is displaced with respect to the gripping portion 81 in the rotation axis direction. In this example, the supporting portion 83 has a disk shape extending in a radial direction around the shaft portion 82, and the supporting portion 83 is formed to be larger than the gripping portion 81 when the multi-stacking jig 8 is viewed from the axial direction of the shaft portion 82. A shape of the supporting portion 83 is not limited to a disk shape.

The contacting portion 84 is provided at an end portion 82E of the shaft portion 82. The contacting portion 84 includes a contact surface 841 in contact with the gripping portion 81 when the shaft portion 82 is displaced with respect to the gripping portion 81 in the rotation axis direction. In this example, the contacting portion 84 has a disk shape, and the contact surface 841 is formed to be larger than the gripping portion 81 when the multi-stacking jig 8 is viewed from the axial direction of the shaft portion 82. A shape of the contacting portion 84 is not limited to a disk shape.

Figure 10:
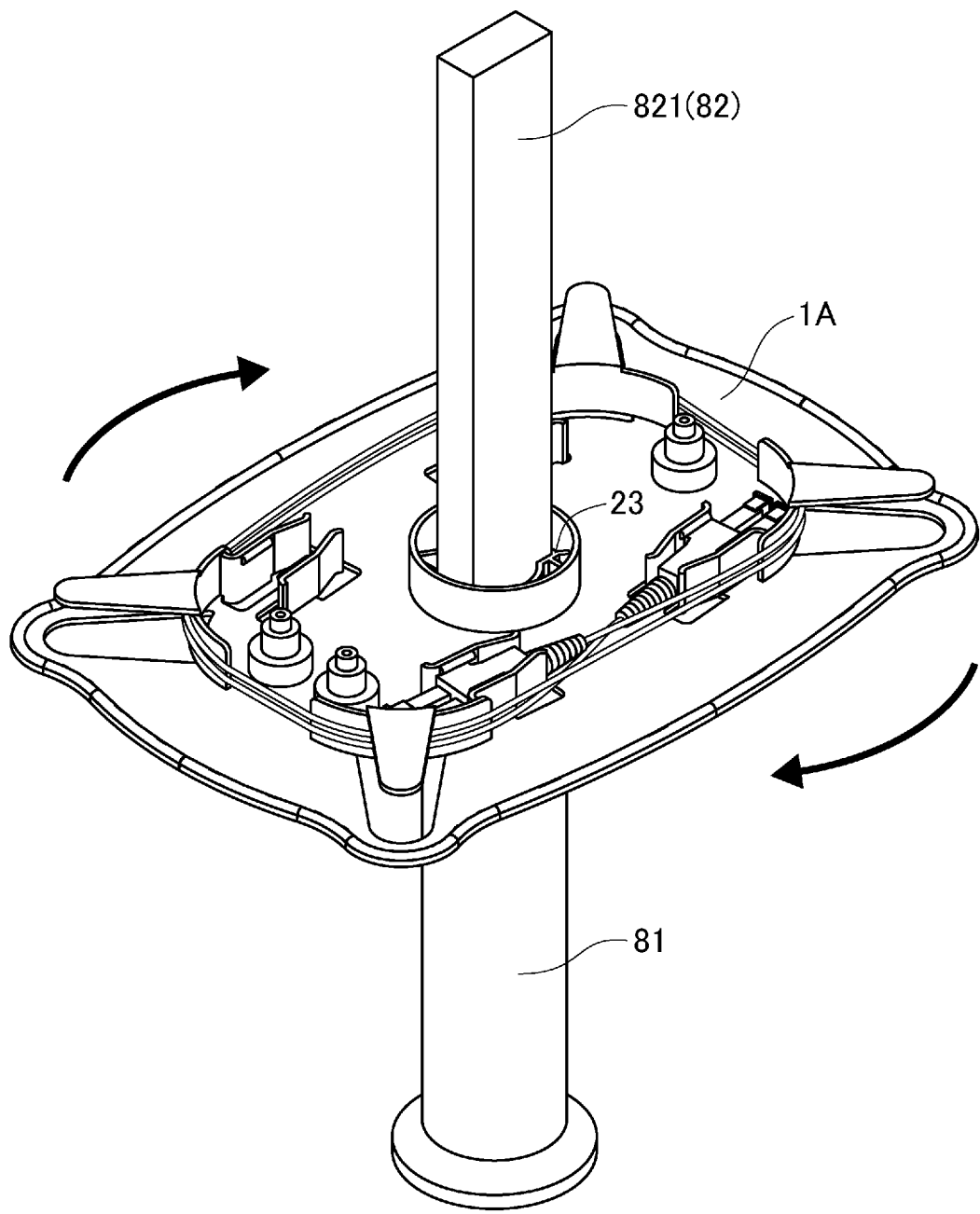
FIG. 10 is a perspective view illustrating a state in which the package is attached to the multi-stacking jig shown in FIG. 9.

When extracting the optical fiber X from the package 1A, the operator first attaches the package 1A to the shaft portion 82 as shown in FIG. 10. Then, after extracting one connector located on an upper side of the package 1A from the mounting portion 4, the operator grips the gripping portion 81 with one hand, and pulls, with the other hand, the extracted connector or the optical fiber X connected to the connector. At this time, since the shaft portion 82 rotates with respect to the gripping portion 81, the inserting portion 821 and the package 1A inserted into the inserting portion 821 rotate about a rotation axis of the shaft portion 82. As described above, when the connector or a part of the optical fiber X extracted from the package 1A is pulled, the package 1A rotates together with the shaft portion 82 of the multi-stacking jig 8, and thus the optical fiber X can be easily extracted from the package 1A. Further, when the shaft portion 82 is displaced with respect to the gripping portion 81 in the rotation axis direction, since the contacting portion 84 is in contact with the gripping portion 81, the shaft portion 82 can be prevented from being extracted from the gripping portion 81.

Figure 11:
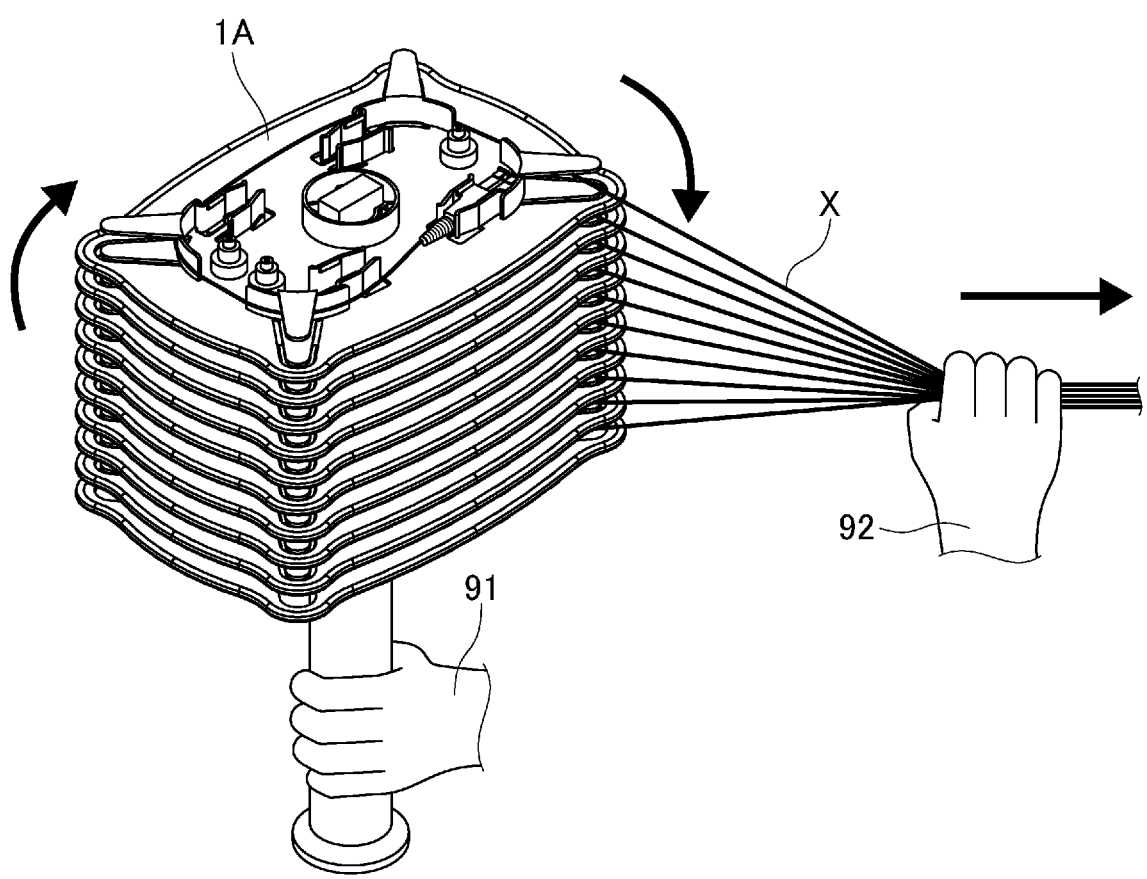
FIG. 11 is a schematic view illustrating a method for extracting optical fibers from the plurality of packages using the multi-stacking jig in FIG. 10.

Although one package 1A is attached to the multi-stacking jig 8 in FIG. 10, a plurality of packages 1A can be attached to the multi-stacking jig 8 to extract a plurality of optical fibers X simultaneously from the plurality of packages 1A as shown in FIG. 11. Specifically, first, as shown in FIG. 11, the connectors of the optical fibers X are respectively extracted from the plurality of packages 1A, and the plurality of packages 1A from which the connectors are extracted are attached to the multi-stacking jig 8. For example, the plurality of packages 1A may be attached to the multi-stacking jig 8 by repeating an operation of extracting the connector, attaching the package 1A to the multi-stacking jig 8, extracting the connector from the next package 1A, and attaching the package 1A to the multi-stacking jig 8. Alternatively, the plurality of packages 1A may be attached to the multi-stacking jig 8 after the connectors are extracted from all the packages 1A.

Next, the operator grips the gripping portion 81 with one hand 91, and pulls together, with the other hand 92, the connectors respectively extracted from the plurality of packages 1A attached to the shaft portion 82 or parts of the optical fibers X connected to the connectors. Accordingly, the optical fibers X can be extracted together from the plurality of packages 1A by a single pulling operation.

The connectors respectively extracted from the plurality of packages 1A are connected to, for example, an external device. The connectors may be connected to the external device after the optical fibers X are extracted from the package, or may be connected to the external device before the optical fibers are extracted from the package.

The multi-stacking jig 8 can also be used when the optical fiber X wound around a package other than the package 1A is extracted. Further, the above method for extracting the optical fiber X can also be applied to a case where the optical fiber X is wound around a package different from the package 1A.

As described above, in the package 1A according to the present invention, the fall-off preventing portions 5 are formed integrally with the base portion 2, and thus the package alone can prevent the optical fiber X from falling off. Therefore, the present invention can provide the package 1A having a simple structure as compared with a case where an optical fiber is prevented from falling off by using a plurality of members. Further, since the package 1A in this example includes the mounting portion 4 to which the first connector X1 and the second connector X2 of the optical fiber X are to be mounted, a winding state of the optical fiber X can be stabilized.

Since the base portion 2 of the package 1A has a substantially quadrangular shape, the package 1A does not excessively rotate with respect to the gripping portion 81 of the multi-stacking jig 8 when the operator extracts the optical fiber X from the package 1A. Since an appropriate resistance is applied to the optical fiber X in a longitudinal direction of the substantially quadrangular shape, it is possible to prevent the optical fiber from unwinding due to excessive rotation of the package 1A.

The connector of the optical fiber X is held in a state of being sandwiched between the pair of gripping portions 411 in the direction D2, and thus when the connector is extracted from the mounting portion 4, the connector can be extracted from the direction D1 or from a direction intersecting the direction D1 and the direction D2.

Since the gripping portion 411 includes, at the front end portion 411E1, the convex portion 411A protruding toward the other gripping portion 411 facing the gripping portion 411, the connector can be prevented from being extracted from the mounting portion 4 in the direction D1, for example, when the package vibrates due to an external force.

Since the interval D10 between the non-connecting portions 411C of the pair of gripping portions 411 decreases toward the first end portions 411E2, the connector can be sandwiched between the pair of non-connecting portions 411C. Accordingly, for example, when the package vibrates due to the external force, the connector can be prevented from being extracted from the mounting portion 4 in the direction D2 or in the direction intersecting the direction D1 and the direction D2. Further, the non-connecting portions 411C are deformed, and thus the connector can be easily attached to the mounting portion 4, and the connector can be easily extracted from the mounting portion 4.

The interval D20 between the gripping portions 411 at the second end portions 411E3 increases toward the tips of the second end portions 411E3, and thus when the connector is extracted from the mounting portion 4 in the direction intersecting the direction D1 and the direction D2, caps C (FIG. 3) attached to a tip of the connector can be prevented from coming into contact with the second end portions 411E3 of the gripping portions 411 and falling off from the connector.

The surface 411S of the second end portion 411E3 facing the other gripping portion 411 is curved in the plan view of the base portion 2, and thus even in a case where the cap C of the connector comes into contact with the second end portion 411E3 when the connector is extracted from the mounting portion 4 in the direction intersecting the direction D1 and the direction D2, the cap C can be guided along the curved surface 411S.

Since the connecting portion 6 includes the convex portion 61 at the front end portion 6E1 and the concave portion 62 at the rear end portion 6E2, the plurality of packages 1A can be connected by fitting the concave portion 62 of the connecting portion 6 of one package 1A to the convex portion 61 of the connecting portion 6 of the other package 1A.

By bringing the convex portion 61 of the connecting portion 6 of the other package 1A into contact with the ribs 64 provided in the concave portion 62 of the connecting portion 6 of the one package 1A, the convex portion 61 of the other connecting portion 6 can be easily inserted into the concave portion 62 of the one connecting portion 6, and the convex portion 61 of the other connecting portion 6 can be easily extracted from the concave portion 62 of the one connecting portion 6.

Since the connecting portions 6 are arranged at the positions corresponding to the vertices of the triangle including the center of the base portion 2 in the plan view of the base portion 2, the operator can recognize one side and the other side in the longitudinal direction of the base portion 2 with respect to the line IL2 as a boundary by the asymmetric arrangement of the connecting portions 6. For example, when winding the optical fiber X around the package 1A, the operator can determine a winding direction of the optical fiber X with reference to the arrangement of the connecting portions 6. Accordingly, winding directions of the optical fibers X can be made the same in the plurality of packages 1A, and thus when the optical fibers X are extracted simultaneously from the plurality of packages 1A, extraction directions of the optical fibers X are reversed, and the optical fibers X can be prevented from being entangled with each other. Further, when the operator extracts the optical fiber X from the package 1A, the arrangement of the connecting portions 6 makes it easy to visually and easily recognize the connector to be extracted from the mounting portion 4 first, and thus the work efficiency is improved. Further, the three connecting portions 6 are provided, and thus when the plurality of packages 1A are stacked on each other, it is easy to maintain the horizontality of each package 1A.

Since the remaining portion of the optical fiber X wound around the plurality of protruding portions 3 can be wound around the outer periphery of the central protruding portion 7, an extra length of the optical fiber X can be easily adjusted.

Since the fall-off preventing portion 5 includes the extending portion 51 extending in the direction along the flat surface 21 of the base portion 2, the position of the optical fiber X in the direction D1 perpendicular to the flat surface 21 of the base portion 2 can be restricted.

The first axis L1, which is the longitudinal direction of the first connector X1 to be mounted to the first mounting portion 41, and the second axis L2, which is the longitudinal direction of the second connector X2 to be mounted to the second mounting portion 42, intersect each other in the plan view of the base portion 2. Therefore, the optical fiber X to be connected to one of the first connector X1 and the second connector X2 is disposed to intersect over the optical fiber X to be connected to the other connector. Therefore, when the operator extracts the optical fiber X from the package 1A, it is easy to visually and easily recognize that one optical fiber X located on an upper side is to be first extracted among the optical fibers X in an intersecting state, and thus the work efficiency is improved.

Since the protruding portions 3, the mounting portion 4, the fall-off preventing portions 5, and the connecting portions 6 are formed integrally with the base portion 2, the optical fiber X can be stored in the package 1A alone. Therefore, a manufacturing cost of the package 1A can be reduced.

The guide wall 23 has a non-circular hole, and thus when the plurality of packages 1A are stacked on each other, the inserting portion 821 of the multi-stacking jig 8 can be inserted into the holes formed respectively in the plurality of packages 1A. The operator can easily extract the optical fibers X from the packages 1A by rotating the packages 1A about the inserting portion 821 of the multi-stacking jig 8. Therefore, the work efficiency can be improved. Further, since the hole has a non-circular shape, the plurality of stacked packages 1A can be prevented from individually rotating with respect to the inserting portion 821. That is, the operator can rotate the plurality of packages 1A simultaneously together with the inserting portion 821 at the same cycle.

Since the optical fiber X stored in the package 1A alone is provided as a package product, the optical fiber X can be easily extracted from the package 1A.

As shown in FIG. 1, the mounting portion 4 may further include a third mounting portion 43 and a fourth mounting portion 44. The third mounting portion 43 is configured to mount the first connector X1 of the optical fiber X to be wound over the plurality of protruding portions 3. The fourth mounting portion 44 is configured to mount the second connector X2 of the optical fiber X to be wound over the plurality of protruding portions 3. A third axis L3, which is the longitudinal direction of the first connector X1 to be mounted to the third mounting portion 43, and a fourth axis L4, which is the longitudinal direction of the second connector X2 to be mounted to the fourth mounting portion 44, intersect each other in the plan view of the base portion 2. In this example, the third mounting portion 43 and the fourth mounting portion 44 are arranged in the other of the two regions divided by the line IL1 passing through the center of the base portion 2 and extending in the longitudinal direction of the base portion 2.

Figure 12:
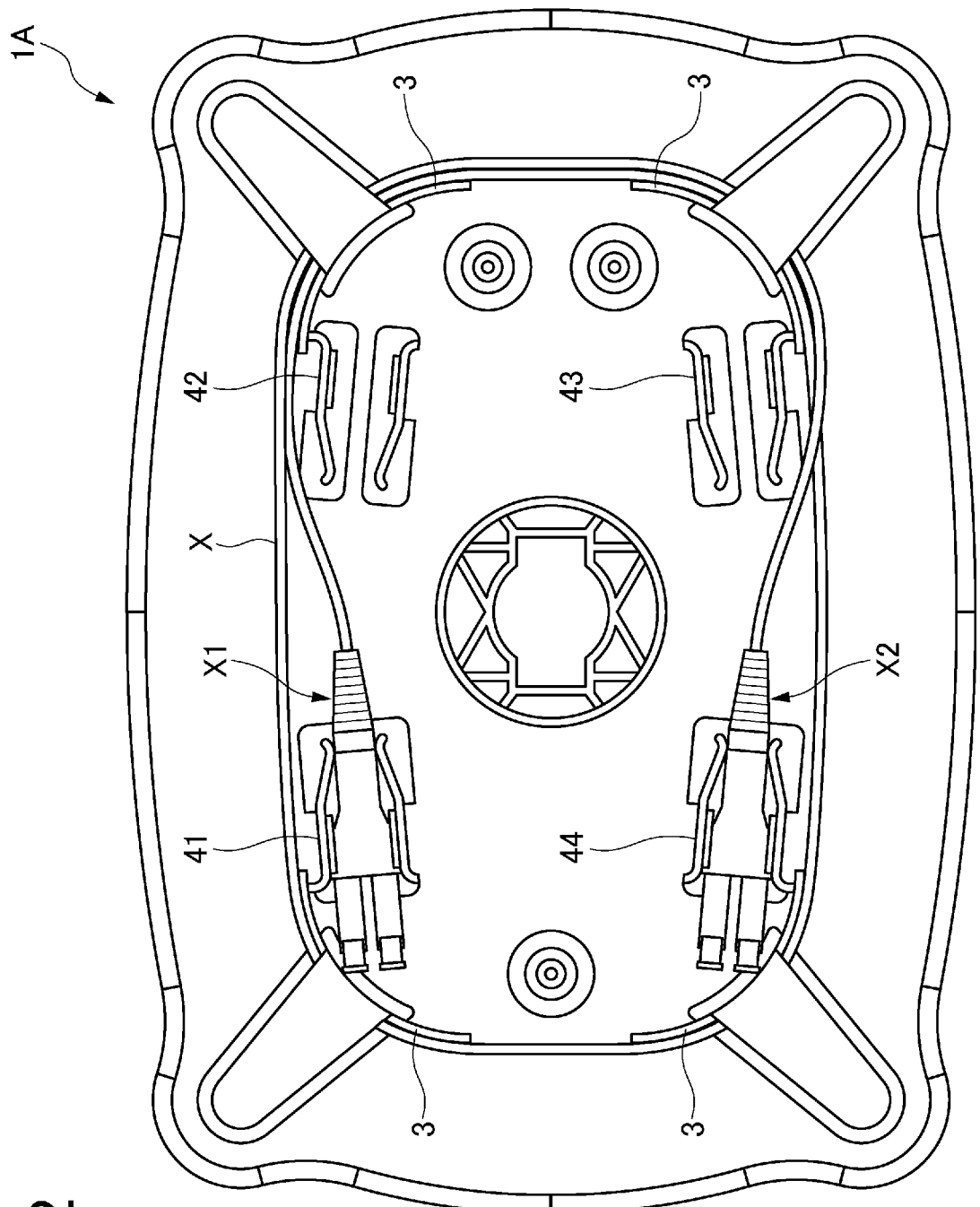
FIG. 12 is a plan view illustrating a modification of the state in which the optical fiber is wound around the package shown in FIG. 1.

According to such a configuration, for example, as shown in FIG. 12, when the first connector X1 is mounted to the first mounting portion 41, and the optical fiber X connected to the first connector X1 is wound around the package 1A, the second connector X2 can be mounted to the fourth mounting portion 44 instead of the second mounting portion 42 according to the extra length of the optical fiber X. Accordingly, the extra length of the optical fiber X can be easily adjusted.

Figure 13:
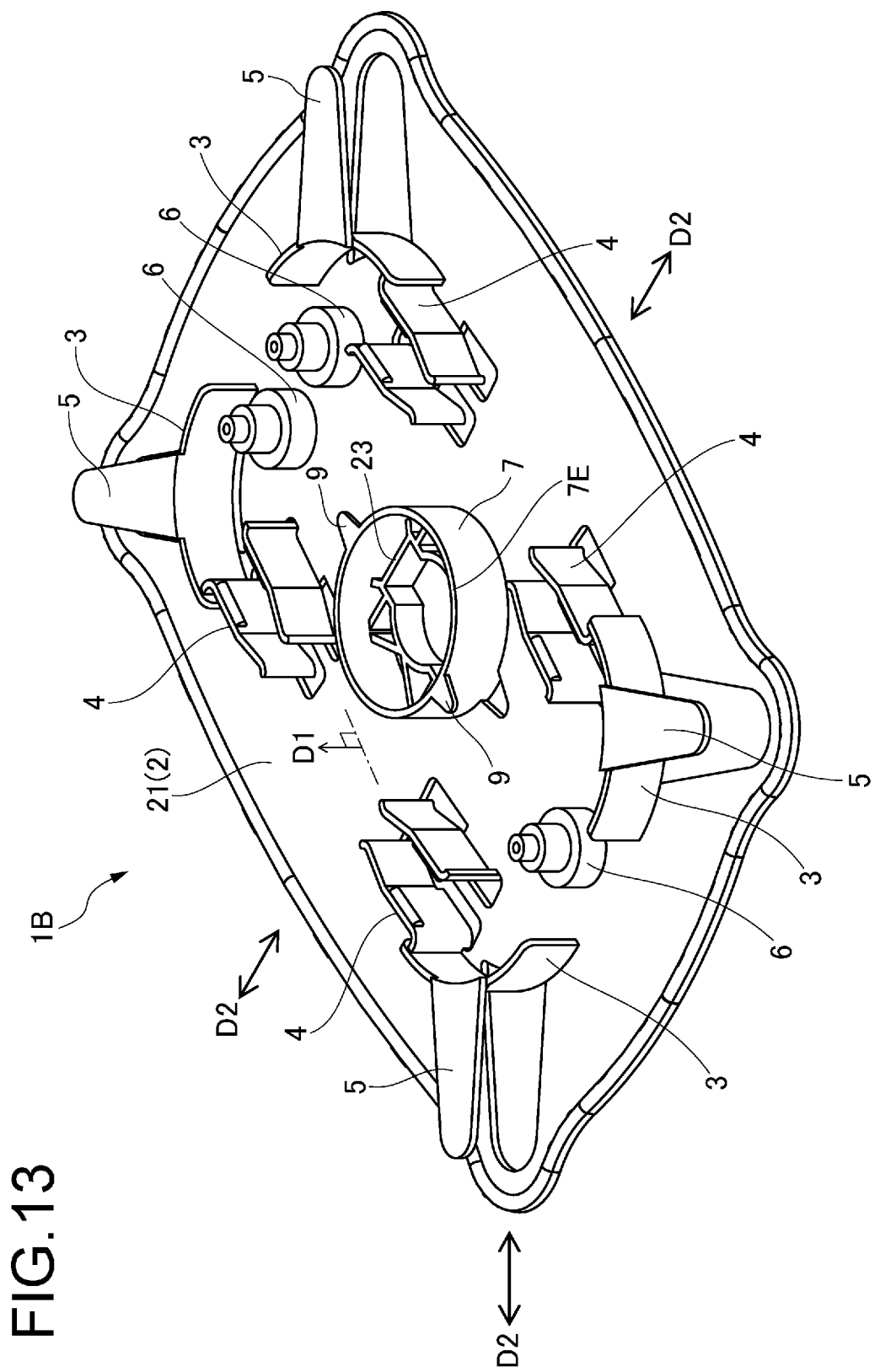
FIG. 13 is a perspective view of a modification of the package.

As shown in FIG. 13, a package 1B may include extending portions 9 extending from the central protruding portion 7 in the direction along the flat surface 21 of the base portion 2. A configuration of the package 1B other than the extending portions 9 is the same as that of the package 1A, and thus a detailed description thereof will be omitted.

In this example, the two extending portions 9 are formed integrally with the central protruding portion 7, and each of the extending portions 9 extends in the direction D2 perpendicular to the longitudinal direction of the optical fiber X to be wound over the plurality of protruding portions 3 from a front end 7E of the central protruding portion 7 in a direction in which the central protruding portion 7 protrudes from the flat surface 21 of the base portion 2. For example, a length of the extending portion 9 may be appropriately set to a dimension so that the optical fiber X wound around the central protruding portion 7 is covered by the extending portion 9 in the plan view of the base portion 2. According to such a configuration, the position of the optical fiber X in the direction D1 perpendicular to the flat surface 21 of the base portion 2 can be restricted by the extending portion 9. Although the two extending portions 9 are formed at the package 1A, the number of the extending portions 9 is not limited to two.

(Second Embodiment)

Figure 14:
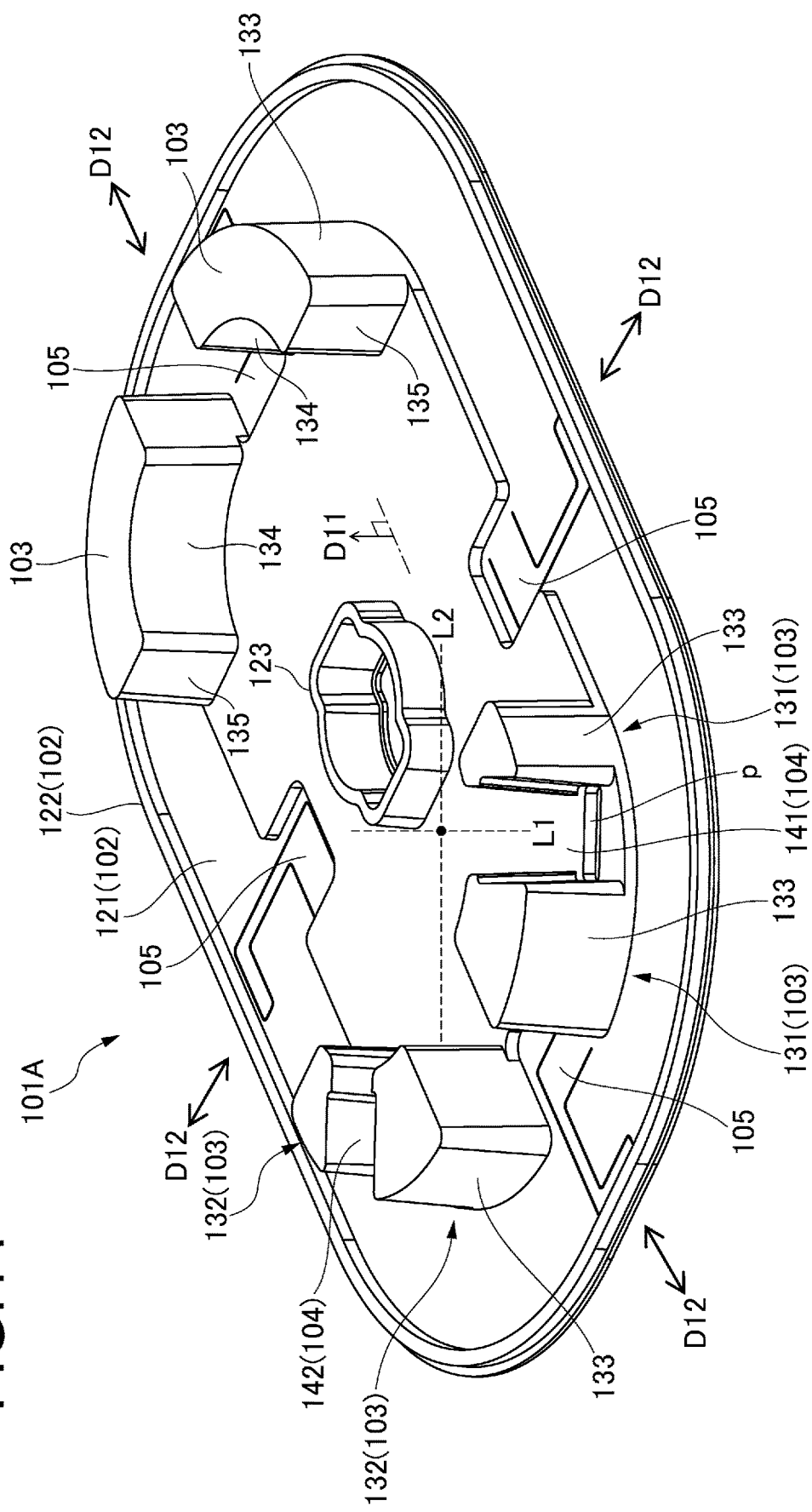
FIG. 14 is a perspective view of a package for an optical fiber according to a second embodiment of the present invention.
Figure 15:
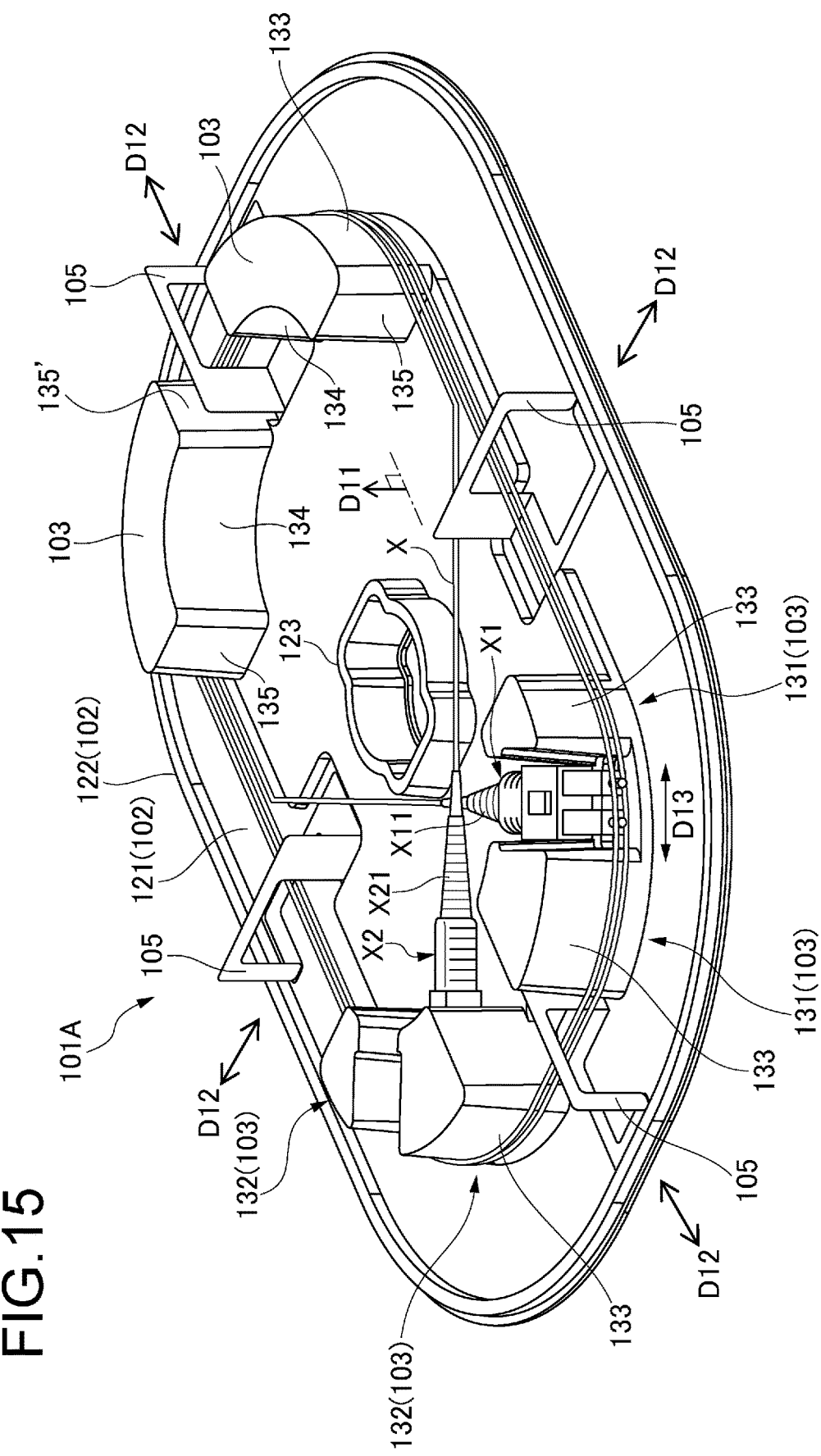
FIG. 15 is a perspective view illustrating a state in which the optical fiber is wound around the package.

FIG. 14 is a perspective view of a package 101A for the optical fiber X with the connector according to a second embodiment of the present invention. FIG. 15 is a perspective view illustrating a state in which the optical fiber X is wound around the package 101A. As shown in FIG. 15, the package 101A is configured to wind and store the optical fiber X including the connector mounted to at least one end thereof. In this example, the optical fiber X is the optical fiber with the connector including the first connector X1 and the second connector X2 at the respective end portions of the optical fiber. The first connector X1 and the second connector X2 in this example have the same shape, but may have different shapes.

As shown in FIGS. 14 and 15, the package 101A includes a base portion 102, a plurality of protruding portions 103, a mounting portion 104, and a plurality of fall-off preventing portions 105. In this example, an arrow D11 indicates a direction (hereinafter, referred to as a direction D11) perpendicular to a flat surface 121 of the base portion 102. An arrow D12 indicates a direction (hereinafter, referred to as a direction D12) perpendicular to a longitudinal direction of the optical fiber X to be wound over the plurality of protruding portions 103 and the direction D11. An arrow D13 indicates the longitudinal direction (hereinafter, referred to as a direction D13) of the optical fiber X to be wound over the plurality of protruding portions 103.

The base portion 102 is a thin flat plate as a base of the package 101A, and includes the flat surface 121 and an outer periphery 122. A thickness of the base portion 102 is, for example, 0.5 mm to 1 mm. A material of the base portion 102 is, for example, a synthetic resin such as saturated polyester or amorphous polyethylene terephthalate. In a plan view of the base portion 102, a shape of the base portion 102 is preferably an elliptical shape or a quadrangular shape with rounded corners, but may be a square shape, a rectangular shape, or a polygonal shape. A guide wall 123 is formed near a center of the base portion 102. A hole is formed inside the guide wall 123. The hole has a non-circular shape in the plan view of the base portion 102, and penetrates the base portion 102.

The plurality of protruding portions 103 protrude from the flat surface 121 of the base portion 102, and are arranged along the outer periphery 122 of the base portion. The optical fiber X is wound over the plurality of protruding portions 103 on the flat surface 121 along a part of an outer periphery of each of the protruding portions 103 (FIG. 15). In this example, four protruding portions 103 are arranged apart from each other on the flat surface 121. Further, the plurality of protruding portions 103 may be formed integrally with the base portion 102. For example, the plurality of protruding portions 103 may be formed together with the base portion 102 by hot pressing a plate member before processing. In this example, the plurality of protruding portions 103 include a pair of first protruding portions 131 and a pair of second protruding portions 132 arrange next to the first protruding portions 131 along the outer periphery 122 of the base portion 102.

The protruding portion 103 includes an outer peripheral surface 133 located near the outer periphery 122 of the base portion 102, an inner peripheral surface 134 located closer to the center of the base portion 102 than the outer peripheral surface 133, a first connection surface 135 located near the center of the base portion 102 and connecting the outer peripheral surface 133 and the inner peripheral surface 134, and the connection surface 135' connecting the outer peripheral surface 133 and the inner peripheral surface 134. In this example, the first connection surface 135 is located closer to the guide wall 123 than the other connection surface 135'. The outer peripheral surface 133, the inner peripheral surface 134, and the first connection surface 135 all protrude from the flat surface 121 of the base portion 102. The outer peripheral surface 133 and the inner peripheral surface 134 may have an arc shape so as to be parallel to the outer periphery 122 of the base portion 102 in the plan view of the base portion 102. The inner peripheral surface 134 and the first connection surface 135 may be perpendicular to the flat surface 121 of the base portion 102. The outer peripheral surface 133 may be inclined with respect to a surface perpendicular to the flat surface 121 of the base portion 102. An inclination angle of the outer peripheral surface 133 with respect to the surface perpendicular to the flat surface 121 is, for example, 5°.

The mounting portion 104 is configured to mount the first connector X1 and the second connector X2 of the optical fiber X (FIG. 15). The mounting portion 104 may be formed integrally with the base portion 102. For example, the mounting portion 104 may be formed together with the base portion 102 and the plurality of protruding portions 103 by hot pressing the plate member before processing. The mounting portion 104 includes a first mounting portion 141 and a second mounting portion 142. The first mounting portion 141 is configured to mount the first connector X1 of the optical fiber X to be wound over the plurality of protruding portions 103. The second mounting portion 142 is configured to mount the second connector X2 of the optical fiber X to be wound over the plurality of protruding portions 103. In this example, the first mounting portion 141 is disposed at the first protruding portion 131, and the second mounting portion 142 is disposed at the second protruding portion 132.

The first mounting portion 141 is formed to engage with the first connector X1. The first mounting portion 141 is configured to sandwich and hold the first connector X1 in the direction D13. In other words, the first connector X1 is held in a state of being sandwiched between the pair of first protruding portions 131 in the direction D13. Further, the first mounting portion 141 may have a slight step p in the direction D11. Similarly, the second mounting portion 142 is formed to engage with the second connector X2. The second mounting portion 142 is configured to sandwich and hold the second connector X2 in the direction D13. In other words, the second connector X2 is held in a state of being sandwiched between the pair of second protruding portions 132 in the direction D13. Further, the second mounting portion 142 may have a slight step P in the direction D11. In this way, the first connector X1 is mounted to the first mounting portion 141, and the second connector X2 is mounted to the second mounting portion 142.

As shown in FIG. 14, the first axis L1, which is the longitudinal direction of the first connector X1 to be mounted to the first mounting portion 141, and the second axis L2, which is the longitudinal direction of the second connector X2 to be mounted the second mounting portion 142, intersect each other in the plan view of the base portion 102. Further, as shown in FIG. 15, a boot X11 of the first connector X1 to be mounted to the first mounting portion 141 and a boot X21 of the second connector X2 to be mounted to the second mounting portion 142 intersect each other in the plan view of the base portion 102. In this example, the first axis L1 and the second axis L2 (the boot X11 and the boot X21) may intersect between the first protruding portion 131 and the second protruding portion 132, and between the guide wall 123 and the first protruding portion 131 or between the guide wall 123 and the second protruding portion 132 in the plan view of the base portion 102.

The fall-off preventing portions 105 may be formed integrally with the base portion 102. The fall-off preventing portion 105 is configured to restrict a position of the optical fiber X to be wound over the plurality of protruding portions 103. Specifically, the fall-off preventing portion 105 is configured to restrict a position of the optical fiber X in the direction D11 perpendicular to the flat surface 121 of the base portion 102, and the direction D12 perpendicular to the longitudinal direction (the direction D13) of the optical fiber X to be wound around the plurality of protruding portions 103 and the direction D11.

A thickness of the fall-off preventing portion 105 is the same as the thickness of the base portion 102, and is, for example, 0.5 mm to 1 mm. The fall-off preventing portion 105 is disposed between the protruding portions 103 adjacent to each other in the direction D13 (the longitudinal direction of the optical fiber X). In this example, four fall-off preventing portions 105 are provided apart from each other. Shapes of the fall-off preventing portions 105 are the same as each other.

Figure 16:
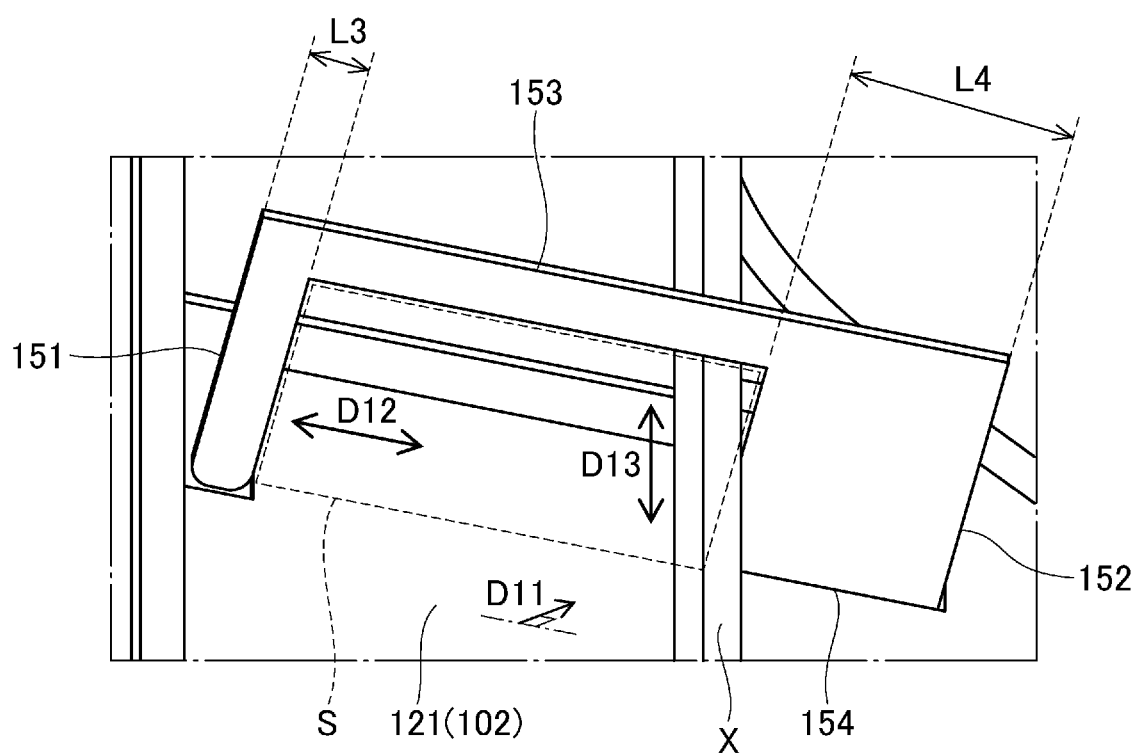
FIG. 16 is an enlarged schematic view of a fall-off preventing portion of the package shown in FIG. 14.

FIG. 16 is an enlarged schematic view of one fall-off preventing portion 105. As shown in FIG. 16, the fall-off preventing portion 105 includes an outer peripheral piece 151 located near the outer periphery 122 of the base portion 102, an inner peripheral piece 152 located closer to the center of the base portion 102 than the outer peripheral piece 151, and a continuous portion 153 connecting the outer peripheral piece 151 and the inner peripheral piece 152. In this example, the inner peripheral piece 152 is located near the guide wall 123. The outer peripheral piece 151 is configured to restrict the position of the optical fiber X in the direction D12. The continuous portion 153 is configured to restrict the position of the optical fiber X in the first direction. As shown in FIG. 16, the fall-off preventing portion 105 is configured to hold the optical fiber X in a space S surrounded by the inner peripheral piece 152, the continuous portion 153, and the outer peripheral piece 151.

The outer peripheral piece 151 is not connected to the base portion 102, and the inner peripheral piece 152 is connected to the base portion 102. That is, the fall-off preventing portion 105 is formed by cutting and raising the base portion 102, and the fall-off preventing portion 5 is formed integrally with the base portion 102 via a base end portion 154 connecting the inner peripheral piece 152 and the base portion 102. The base end portion 154 is formed along the direction D12. The base portion 102 in this example has a cut that borders an outer shape of the fall-off preventing portion 105 in addition to the base end portion 154 of the inner peripheral piece 152. In an initial state in which the optical fiber X is not held, the fall-off preventing portion 105 (the inner peripheral piece 152, the continuous portion 153, and the outer peripheral piece 151) is located on the flat surface 121 of the base portion 102. In a case of holding the optical fiber X, the fall-off preventing portion 105 is configured to be folded up from the flat surface 121 of the base portion 102 around the base end portion 154 of the inner peripheral piece 152.

The inner peripheral piece 152 of the fall-off preventing portion 105 may be inclined with respect to the flat surface 121 of the base portion 102 (FIG. 16), or may be folded up to be perpendicular to the flat surface 121 of the base portion 102 (FIG. 15). The outer peripheral piece 151, the inner peripheral piece 152, and the continuous portion 153 folded up from the flat surface 121 of the base portion 102 are located on the same flat surface (in this example, a flat surface perpendicular to the direction D13). A length L3 of the outer peripheral piece 151 in the direction D12 is shorter than a length L4 of the base end portion 154 (a portion where the inner peripheral piece 152 is connected to the base portion 102) of the inner peripheral piece 152.

Figure 17:
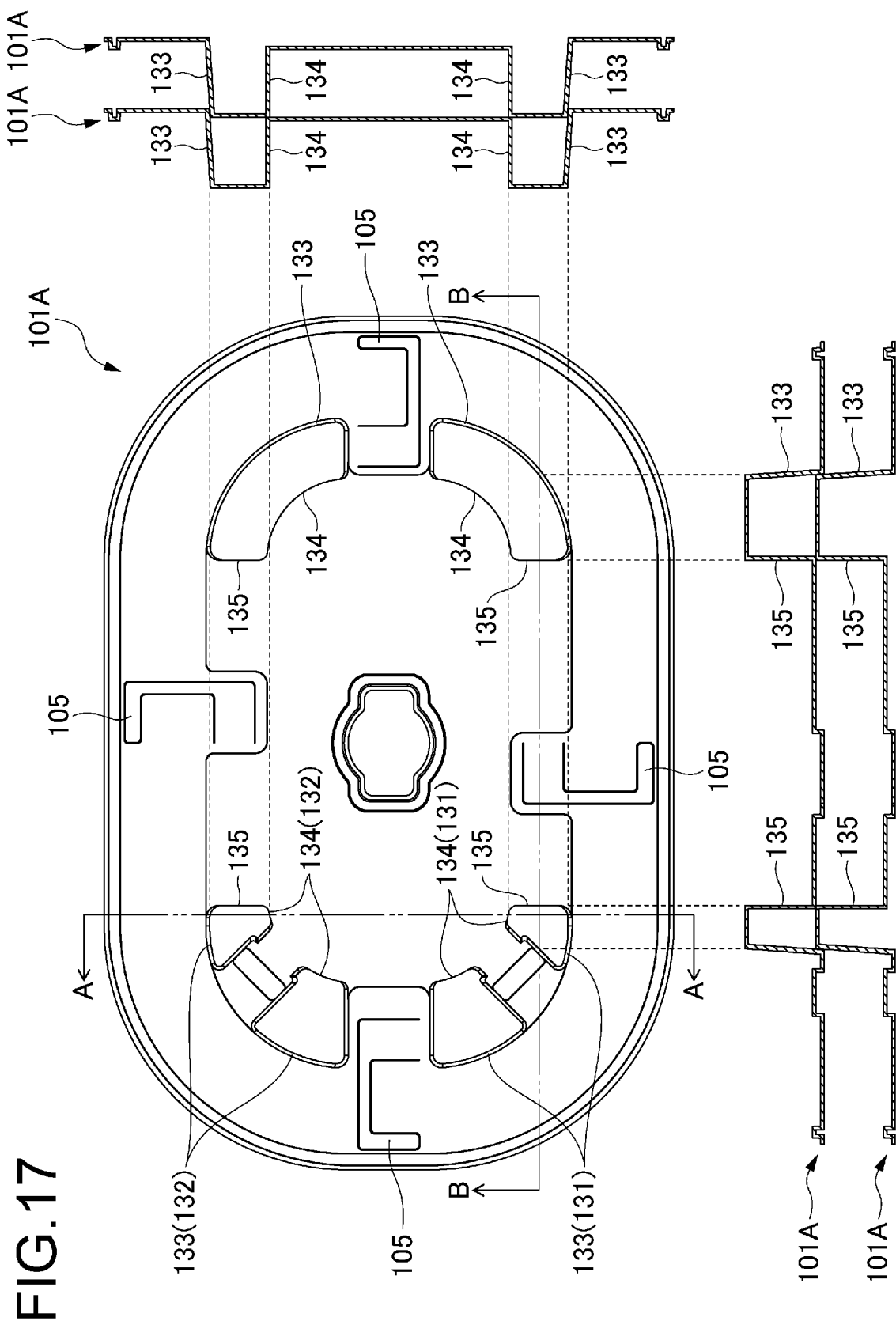
FIG. 17 shows a plan view of the package shown in FIG. 14 and a cross-sectional view illustrating a state in which a plurality of packages are stacked.

FIG. 17 shows a plan view of the package 101A and a cross-sectional view in a case where the plurality of packages 101A are stacked on each other in the direction D11. As shown in FIG. 17, when the plurality of packages 101A are stacked, a bottom portion of the upper package 101A is fitted to the corresponding protruding portion 103 of the lower package 101A. Hereinafter, the first protruding portion 131 in the case where the plurality of packages 101A are stacked will be described. The other protruding portions 103 have the same configuration as the first protruding portion 131, and thus the description thereof will be omitted.

An upper portion (a front end portion in a direction in which the first protruding portion 131 protrudes) of the first protruding portion 131 of the lower package 101A is fitted into a bottom portion (a rear end portion in the direction in which the first protruding portion 131 protrudes) of the first protruding portion 131 of the upper package 101A. As shown in a A-A cross-sectional view of FIG. 17, since the inner peripheral surface 134 of the first protruding portion 131 is perpendicular to the flat surface 121 of the base portion 102, it is easy to maintain the horizontality of each package 101A. Further, in this example, since the four protruding portions 103 are provided, it is easier to maintain the horizontality of each package 101A. Since the outer peripheral surface 133 of the first protruding portion 131 is inclined with respect to the surface perpendicular to the flat surface 121 of the base portion 102, it is easy to guide the first protruding portion 131 of the lower package 101A to the bottom portion of the first protruding portion 131 of the upper package 101A. Further, as compared with a case where the outer peripheral surface 133 is perpendicular to the flat surface 121 of the base portion 102, a contact area between the bottom portion of the first protruding portion 131 of the upper package 101A and the outer peripheral surface 133 of the first protruding portion 131 of the lower package 101A increases, and thus the two packages once fitted are less likely to be extracted from each other.

Further, as shown in a B-B cross-sectional view of FIG. 17, since the first connection surface 135 of the first protruding portion 131 is perpendicular to the flat surface 121 of the base portion 102, it is easier to maintain the horizontality of each package 101A.

Figure 18:
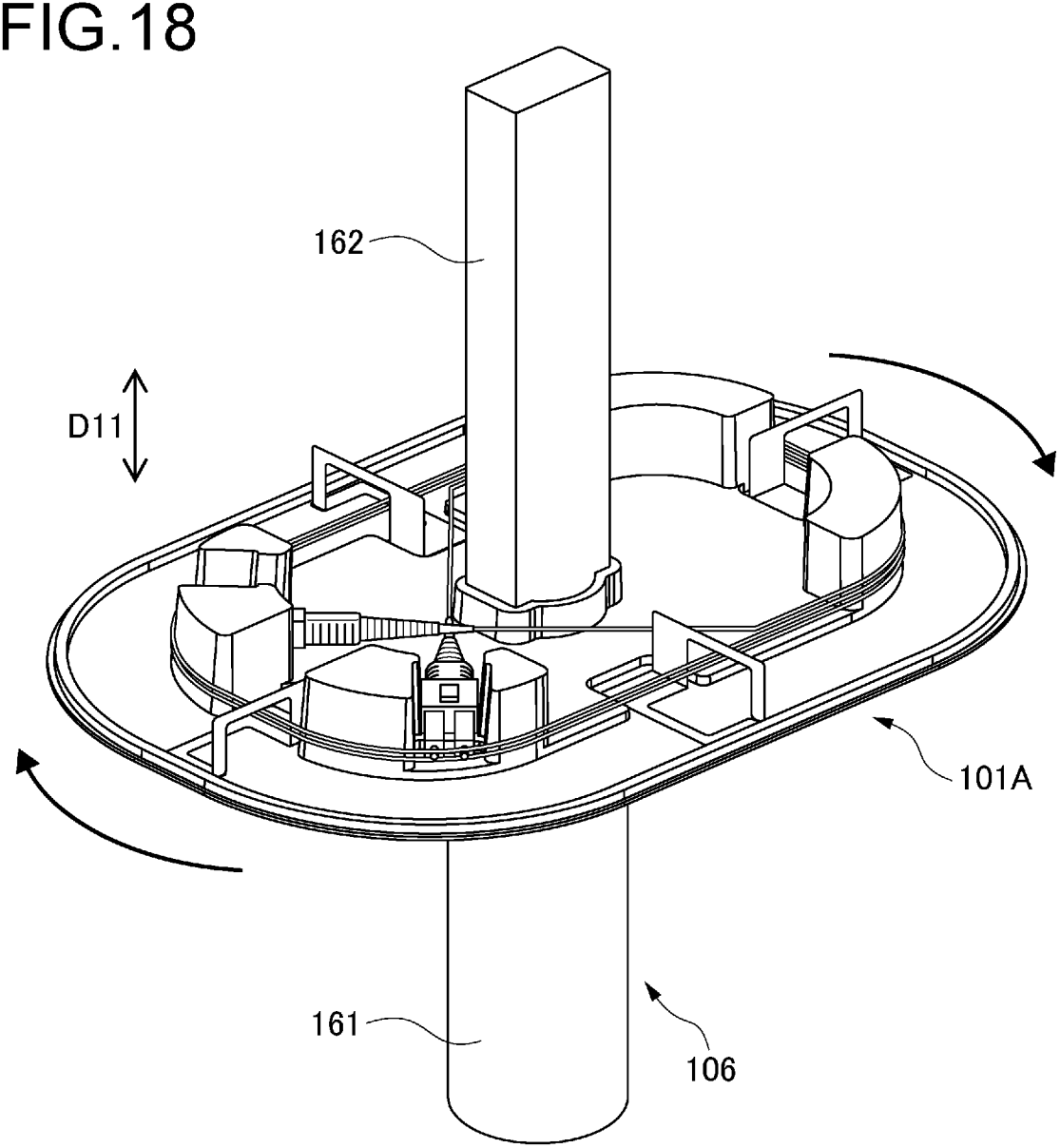
FIG. 18 is a schematic view illustrating a state in which the package is attached to the multi-stacking jig.

Next, a method for using the package 101A will be described. FIG. 18 is a schematic view of a case where the package 101A is attached to the multi-stacking jig 106. As shown in FIG. 18, the multi-stacking jig 106 includes a gripping portion 161 gripped by the operator and an inserting portion 162 to be inserted into the hole of the guide wall 123 of the package 101A.

The gripping portion 161 has a columnar shape extending in the direction D11. The inserting portion 162 is formed to be fitted into the hole of the guide wall 123 of the package 101A, and has a quadrangular prism shape extending in the direction D11. The gripping portion 161 and the inserting portion 162 are connected in a manner that is relatively rotatable about a long axis direction of the inserting portion 162. In a plan view of the package 101A, the gripping portion 161 is thicker than the inserting portion 162. The package 101A guided to the inserting portion 162 via the guide wall 123 is disposed above the gripping portion 161. Although one package 101A is disposed in FIG. 18, the inserting portion 162 is configured to guide the plurality of packages 101A. Shapes of the gripping portion 161 and the inserting portion 162 are not limited to a columnar shape or a quadrangular prism shape.

The operator connects the first connector X1 or the second connector X2 of the optical fiber X wound around the package 101A to an external device as necessary. At this time, it may be difficult to distinguish which connector among the first connector X1 and the second connector X2 should be extracted to easily extract the optical fiber. However, in this example, since the boot X11 of the first connector X1 to be mounted to the first mounting portion 141 and the boot X21 of the second connector X2 to be mounted to the second mounting portion 142 intersect each other in the plan view of the base portion 102, it is easy to visually and easily recognize that a connector corresponding to one boot located on an upper side in the direction D11 is first to be extracted among the two boots in an intersecting state. The operator can easily determine that the one connector located on the upper side among the first connector X1 and the second connector X2 is to be first extracted from the mounting portion 104.

After extracting the one connector located on the upper side from the mounting portion 104, the operator grips the gripping portion 161 with one hand, and pulls, with the other hand, the extracted connector or the optical fiber X connected to the connector. At this time, since the gripping portion 161 and the inserting portion 162 rotate relatively, the inserting portion 162 and the package 101A inserted into the inserting portion 162 rotate about an axis of the inserting portion 162. Since the base portion 102 of the package 101A has an elliptical shape, the package 101A does not excessively rotate, and an appropriate resistance is applied to the optical fiber X in a long axis direction of the elliptical shape. At the same time, the optical fiber X held in the space S surrounded by the inner peripheral piece 152, the continuous portion 153, and the outer peripheral piece 151 of the fall-off preventing portion 105 moves in the direction D12, passes through the outer peripheral piece 151 not connected to the base portion 102, and is pulled to an outside of the space S. Since the optical fiber X held by the fall-off preventing portion 105 in this way is pulled to the outside of the space S with the rotation of the package 101A, the operator can easily extract the optical fiber X from the package 101A.

As described above, in the package 101A in this example, the fall-off preventing portions 105 are formed integrally with the base portion 102, and thus the package alone can prevent the optical fiber X from falling off. Therefore, the present invention can provide the package 101A having a simple structure as compared with the case where the optical fiber is prevented from falling off by using the plurality of members. Further, since the package 101A in this example includes the mounting portion 104 to which the first connector X1 and the second connector X2 of the optical fiber X are to be mounted, the winding state of the optical fiber X can be stabilized.

Since the base portion 102 of the package 101A has an elliptical shape, the package 101A does not excessively rotate with respect to the gripping portion 161 of the multi-stacking jig 106 when the operator extracts the optical fiber X from the package 101A. Since an appropriate resistance is applied to the optical fiber X in the long axis direction of the elliptical shape, it is possible to prevent the optical fiber from unwinding due to excessive rotation of the package 101A.

Since the fall-off preventing portion 105 alone can prevent the optical fiber X from falling off in two directions of the direction D11 and the direction D12, it is possible to provide the package 101A having a simple structure as compared with the case where the optical fiber X is prevented from falling off by using the plurality of members.

Since the fall-off preventing portion 105 is disposed between the adjacent protruding portions 103, the fall-off preventing portion 105 can prevent the optical fiber wound from one of the adjacent protruding portions 103 to the other protruding portion 103 from falling off.

The fall-off preventing portion 105 holds the optical fiber X in the space S surrounded by the inner peripheral piece 152, the continuous portion 153, and the outer peripheral piece 151 of the fall-off preventing portion 105, and thus can prevent the optical fiber X from being extracted from the package 101A. Further, the outer peripheral piece 151 is not connected to the base portion 102. Therefore, the operator can easily draw out the optical fiber X as necessary by passing the optical fiber X held in the space S from a portion where the base portion 102 and the outer peripheral piece 151 are not connected.

Since the inner peripheral piece 152 is inclined with respect to the flat surface 121 of the base portion 102, the operator can appropriately guide the optical fiber X to be wound around the plurality of protruding portions 103 to the space S along the inner peripheral piece 152.

Since the length L3 of the outer peripheral piece 151 in the direction D12 is shorter than the length L4 of the inner peripheral piece 152 connected to the base portion 102, the portion where the base portion 102 and the outer peripheral piece 151 are not connected to each other in the direction D12 is also short. Therefore, the operator can easily draw out the optical fiber X in the direction D12 by moving the optical fiber X held in the space S in the direction D12. Therefore, the work efficiency at the time of extracting the optical fiber X is improved.

In general, when the operator extracts the optical fiber stored in the package from the package as necessary, it may be difficult to distinguish which connector among the two connectors of the optical fiber should be extracted to easily extract the optical fiber. However, in the present invention, since the first axis L1 of the first connector X1 and the second axis L2 of the second connector X2 intersect each other in the plan view of the base portion 102, the optical fiber to be connected to one of the first connector X1 and the second connector X2 is disposed to intersect over the optical fiber to be connected to the other connector. When the operator extracts the optical fiber from the package, it is easy to visually and easily recognize that the one optical fiber located on the upper side is first to be extracted among the optical fibers in the intersecting state, and thus the work efficiency is improved.

The inner peripheral surface 134 of the protruding portion 103 is perpendicular to the flat surface 121 of the base portion 102, and the outer peripheral surface 133 is inclined with respect to the flat surface 121 of the base portion 102, and thus when the plurality of packages 101A are stacked in the direction D11, the operator can easily guide the protruding portion 3 of the other package 101A to a bottom portion of one package 101A while maintaining the horizontality of each package 101A. Further, the outer peripheral surface 133 is inclined with respect to the flat surface 121 of the base portion 102, and thus as compared with the case where the outer peripheral surface 133 is perpendicular to the flat surface 121 of the base portion 102, the two packages 101A once fitted are less likely to be extracted from each other, and the operator can easily handle the plurality of packages 101A.

Since the protruding portions 103, the mounting portion 104, and the fall-off preventing portions 105 in this example are formed integrally with the base portion 102, the optical fiber X can be stored in the package 101A alone. Therefore, a manufacturing cost of the package 101A can be reduced.

The guide wall 123 has a non-circular hole, and thus when the plurality of packages 101A are stacked on each other, the inserting portion 162 of the multi-stacking jig 106 can be inserted into the holes formed respectively in the plurality of packages 101A. The operator can easily extract the optical fibers X from the packages 101A by rotating the packages 101A about the inserting portion 162 of the multi-stacking jig 106. Therefore, the work efficiency can be improved. Further, since the hole has a non-circular shape, the plurality of stacked packages 101A can be prevented from individually rotating with respect to the inserting portion 162. That is, the operator can rotate the plurality of packages 101A simultaneously together with the inserting portion 162 at the same cycle.

This example provides the optical fiber X stored in a single package, and the optical fiber X can be easily extracted.

The boot X11 of the first connector X1 and the boot X21 of the second connector X2 intersect each other in the plan view of the base portion 102, and thus when the operator extracts the optical fiber X from the package 101A, it is easy to visually and easily recognize that the connector corresponding to the one boot located on the upper side is first to be extracted. Therefore, the work efficiency is improved.

In this example, the first mounting portion 141 is disposed at the first protruding portion 131, and the second mounting portion 142 is disposed at the second protruding portion, but the first mounting portion 141 and the second mounting portion 142 may be arranged at one protruding portion 103. Also in this case, the boot of the connector of the optical fiber X mounted on one mounting portion 104 is disposed to be located on an upper side with respect to the boot of the connector of the optical fiber X mounted on the other mounting portion 104. In this way, the operator can easily determine that the one connector located on the upper side is to be first extracted from the mounting portion 104.

Further, the package 101A in this example includes four protruding portions 103 and four fall-off preventing portions 105, but the number of the protruding portions 103 and the number of the fall-off preventing portions 105 are not limited to four. The package 101A may include a plurality of protruding portions 103 and a plurality of fall-off preventing portions 105 according to the allowable radius of curvature of the optical fiber X. The package 101A preferably includes at least three fall-off preventing portions 105, but may include five or more fall-off preventing portions 105. However, if an excessively large number of the fall-off preventing portions 105 are arranged, a resistance corresponding to the number of the fall-off preventing portions 105 is applied to the optical fiber X when the optical fiber X is extracted from the package 101A. Further, the number of times the fall-off preventing portion 105 is folded up from the base portion 102 increases according to the number of the fall-off preventing portions 105. Therefore, the number of the fall-off preventing portions 105 is preferably six or less, and most preferably four.

(Third Embodiment)

THIRD EMBODIMENT

Figure 19:
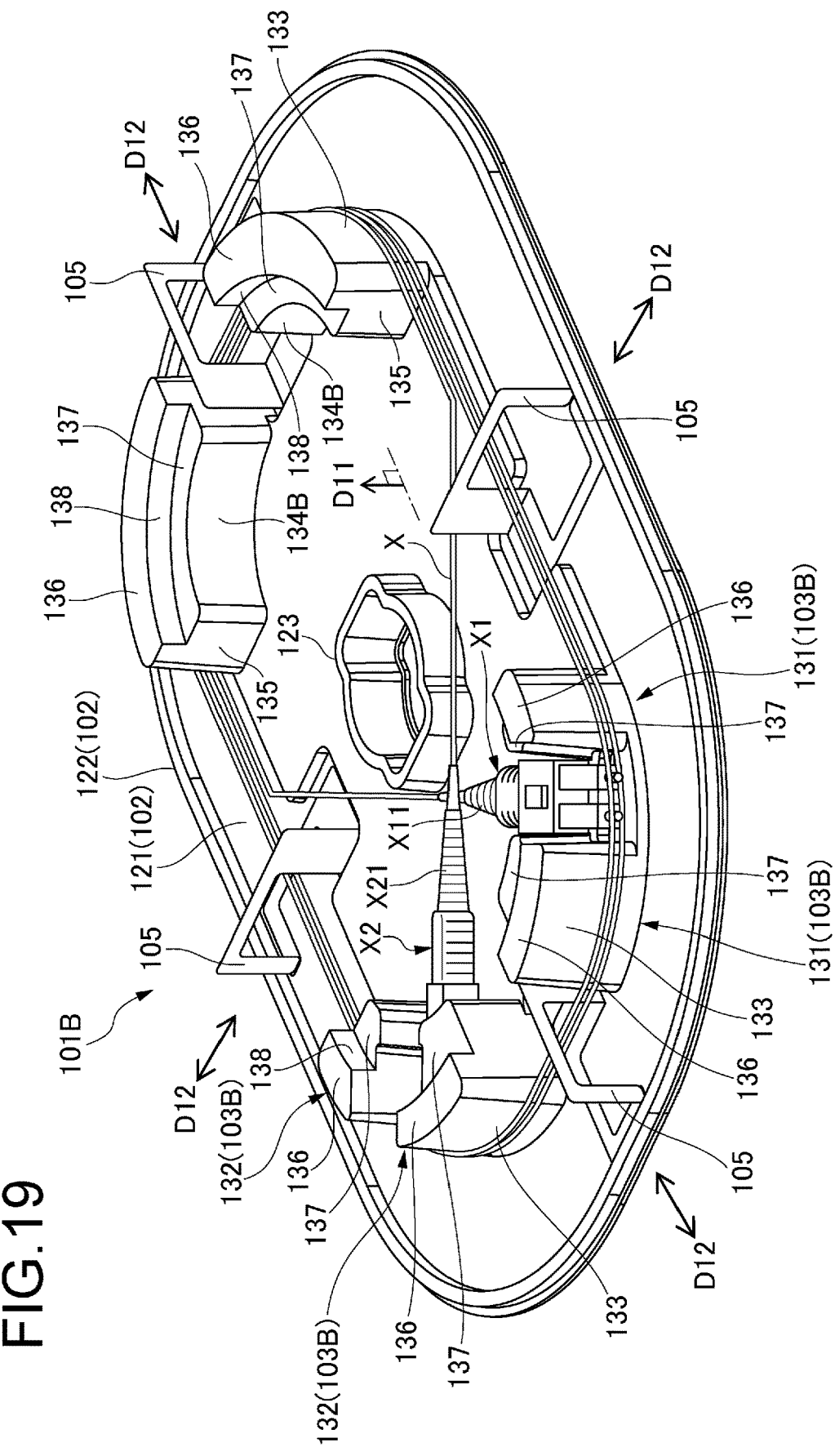
FIG. 19 is a perspective view of a package for an optical fiber according to a third embodiment of the present invention, illustrating a state in which the optical fiber is wound around the package.

FIG. 19 is a perspective view illustrating a state in which the optical fiber X is wound around a package 101B for an optical fiber according to a third embodiment of the present invention. The protruding portion 103 of the package 101A according to the second embodiment includes one upper surface parallel to the flat surface 121 of the base portion 102, whereas each protruding portion 103B of the package 101B according to the third embodiment includes two upper surfaces parallel to the flat surface 121 of the base portion 102. Components substantially the same as configurations illustrated in FIG. 14 are denoted by the same reference numerals, and repeated description thereof will be omitted.

As shown in FIG. 19, the protruding portion 103B of the package 101B includes a first upper surface 136, a second upper surface 137, and a second connection surface 138 that connects the first upper surface 136 and the second upper surface 137. The first upper surface 136 is located closer to the outer periphery 122 of the base portion 102 than the second upper surface 137, and is in contact with the outer peripheral surface 133. The second upper surface 137 is located closer to the center of the base portion 102 (closer to the guide wall 123 in this example) than the first upper surface 136, and is in contact with the inner peripheral surface 134. The first upper surface 136 and the second upper surface 137 are surfaces parallel to the flat surface 121 of the base portion 102, respectively. The second connection surface 138 protrudes from the second upper surface 137. The second connection surface 138 may be inclined with respect to the flat surface 121 of the base portion 102. Further, in this example, the inner peripheral surface 134B may be inclined with respect to the flat surface 121 of the base portion 102.

In the direction D11, the first upper surface 136 is higher than the second upper surface 137. The second upper surface 137 in the direction D11 is preferably higher than the first connector X1 and the second connector X2 of the optical fiber X.

Figure 20:
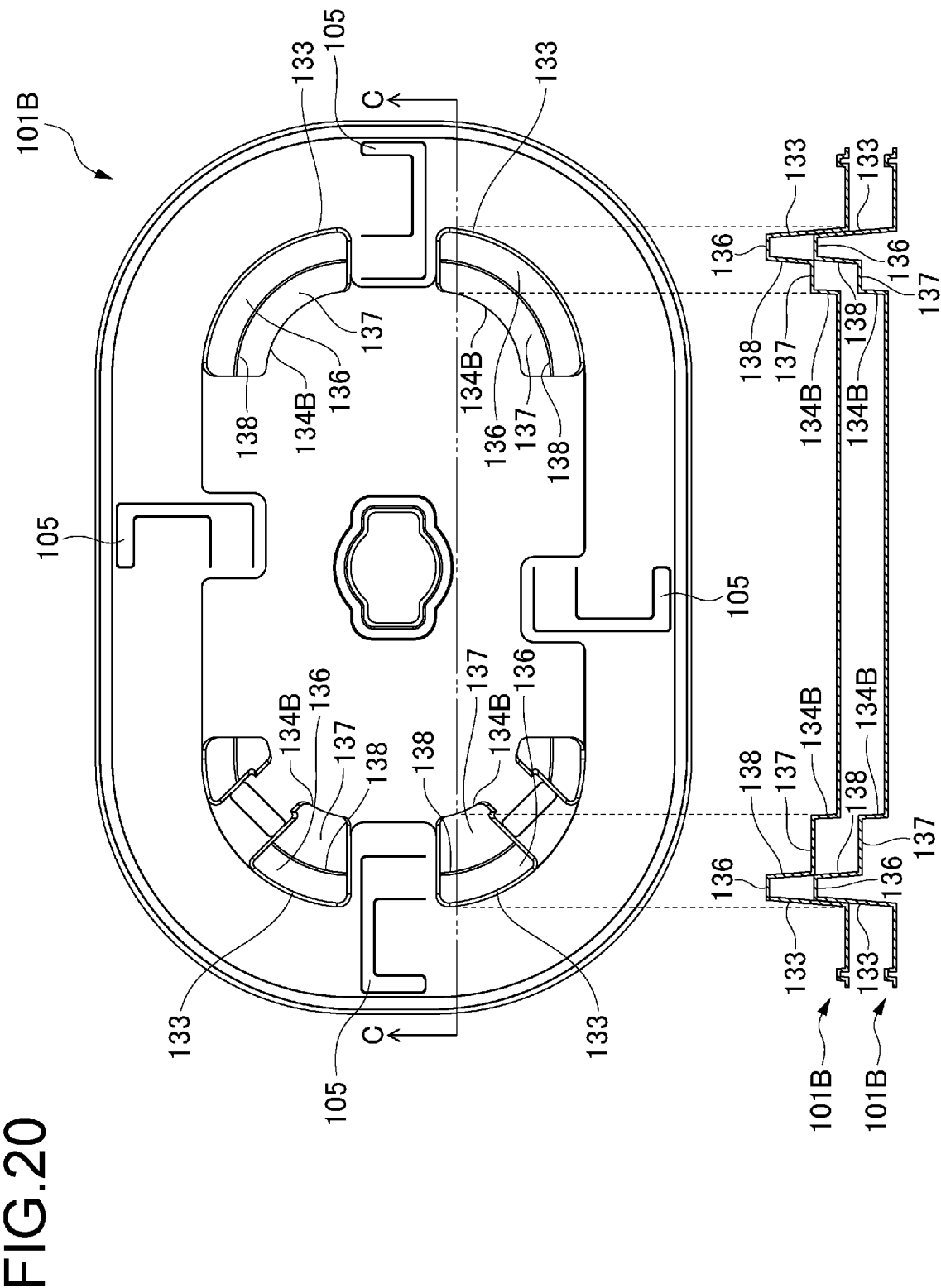
FIG. 20 shows a plan view of the package shown in FIG. 19 and a cross-sectional view illustrating a state in which a plurality of packages are stacked.

FIG. 20 shows a plan view of the package 101B and a cross-sectional view in a case where a plurality of packages 101B are stacked on each other in the direction D11. As shown in FIG. 20, when the plurality of packages 101B are stacked, a bottom portion of the upper package 101B is fitted to the corresponding protruding portion 103B of the lower package 101B. Hereinafter, the first protruding portion 131 in the case where the plurality of packages 101B are stacked will be described. The other protruding portions 103B have the same configuration as the first protruding portion 131, and thus the description thereof will be omitted.

An upper portion of the first protruding portion 131 of the lower package 101B is fitted into a bottom portion of the first protruding portion 131 of the upper package 101B. As shown in a C-C cross-sectional view of FIG. 20, the first upper surface 136 of the lower package 101B is guided between the outer peripheral surface 133 and the second connection surface 138 of the upper package 101B. Since the outer peripheral surface 133 and the second connection surface 138 are inclined with respect to the flat surface 121 of the base portion 102, it is easy to guide the first upper surface 136 of the lower package 101B between the outer peripheral surface 133 and the second connection surface 138 of the upper package 101B. Further, as compared with a case where the outer peripheral surface 133 and the second connection surface 138 are perpendicular to the flat surface 121 of the base portion 102, a contact area between the outer peripheral surface 133 and the second connection surface 138 of the upper package 101B and the outer peripheral surface 133 and the second connection surface 138 of the lower package 101B increases, and thus the two packages once fitted are less likely to be extracted from each other. Further, in this example, since the four protruding portions 103B are provided, it is easier to maintain the horizontality of each package 101B.

(Modification of Fall-Off Preventing Portion 105)

Figure 21:
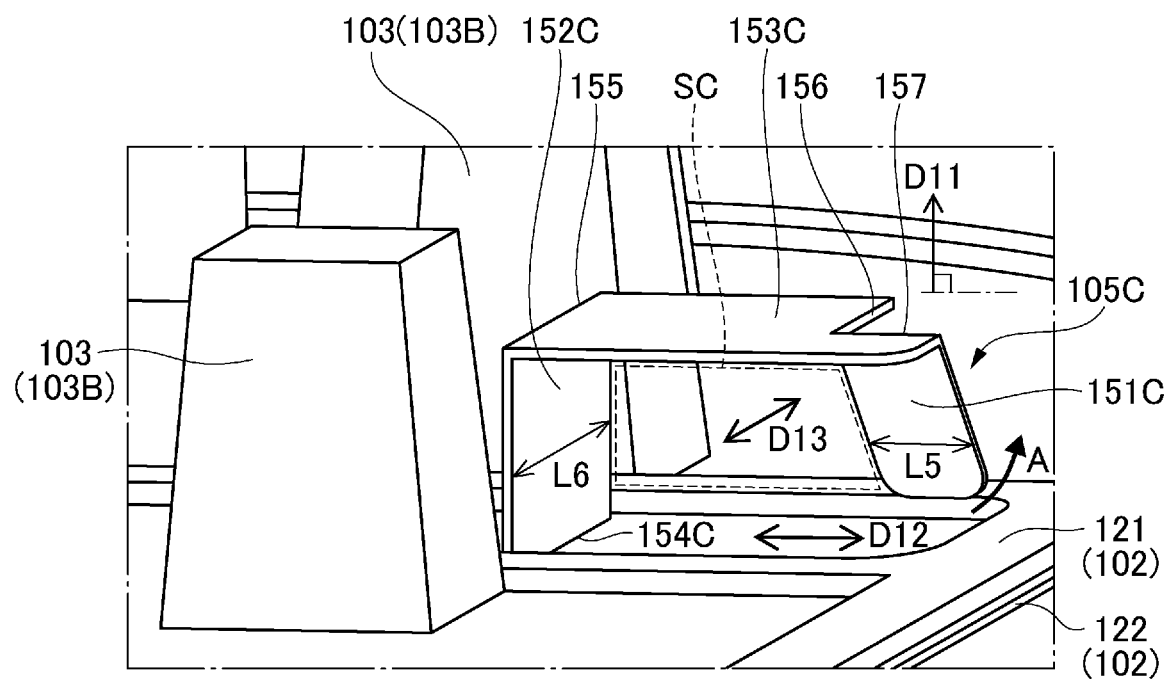
FIG. 21 is an enlarged schematic view of a modification of the fall-off preventing portion.

In the fall-off preventing portion 105 of the package 101A according to the second embodiment or the package 101B according to the third embodiment, the outer peripheral piece 151, the inner peripheral piece 152, and the continuous portion 153 folded up from the flat surface 121 of the base portion 102 are located on the same flat surface, but the configuration of the fall-off preventing portion 105 is not limited thereto. FIG. 21 is an enlarged schematic view of a fall-off preventing portion 105C, which is a modification. Components substantially the same as configurations illustrated in FIG. 16 are denoted by the same reference numerals, and repeated description thereof will be omitted.

As shown in FIG. 21, the fall-off preventing portion 105C includes an outer peripheral piece 151C located near the outer periphery 122 of the base portion 102, an inner peripheral piece 152C located closer to the center of the base portion 102 than the outer peripheral piece 151C, and the continuous portion 153C connecting the outer peripheral piece 151C and the inner peripheral piece 152C. In this example, the fall-off preventing portion 105C is configured to hold the optical fiber X in a space SC surrounded by the inner peripheral piece 152C, the continuous portion 153C, and the outer peripheral piece 151C.

The outer peripheral piece 151C is not connected to the base portion 102, and the inner peripheral piece 152C is connected to the base portion 102. That is, the inner peripheral piece 152C includes a base end portion 154C connected to the base portion 102. The base end portion 154C is formed along the direction D13. The fall-off preventing portion 105C is configured to be folded up from the flat surface 121 of the base portion 102 around the base end portion 154C of the inner peripheral piece 152C. Further, in this example, a first bent portion 155 is formed between the inner peripheral piece 152C and the continuous portion 153C, and a cut portion 156 and a second bent portion 157 are formed between the continuous portion 153C and the outer peripheral piece 151C. The first bent portion 155 is formed along the direction D13. The cut portion 156 is formed along the direction D13, and borders a part of an outer shape of the continuous portion 153C and a part of an outer shape of the outer peripheral piece 151C. The second bent portion 157 is formed along the direction D12. In an initial state in which the optical fiber X is not held, the fall-off preventing portion 105C (the inner peripheral piece 152C, the continuous portion 153C, and the outer peripheral piece 151C) is located on the flat surface 121 of the base portion 102.

In a case of holding the optical fiber X, the fall-off preventing portion 105C is folded up from the flat surface 121 of the base portion 102C around the base end portion 154C of the inner peripheral piece 152C. Next, the continuous portion 153C and the outer peripheral piece 151C are bent from the inner peripheral piece 152C toward the outer periphery 122 of the base portion 102 about the first bent portion 155. The outer peripheral piece 151C is configured to be bent from the continuous portion 153C toward the base portion 102 about the second bent portion 157.

The inner peripheral piece 152C of the fall-off preventing portion 105C may be inclined with respect to the flat surface 121 of the base portion 102, or may be folded up to be perpendicular to the flat surface 121 of the base portion 102 (FIG. 21). The outer peripheral piece 151C, the inner peripheral piece 152C, and the continuous portion 153C folded up from the flat surface 121 of the base portion 102 are located on different flat surfaces. For example, the outer peripheral piece 151C is configured to be located on a flat surface inclined or perpendicular to the direction D13. The inner peripheral piece 152C is configured to be located on a flat surface perpendicular to the direction D12. The continuous portion 153C is configured to be located on a flat surface perpendicular to the direction D11, and may be parallel to the flat surface 121 of the base portion 102. A length L5 of the outer peripheral piece 151C in the direction D12 is shorter than a length L6 of the base end portion 154C (a portion where the inner peripheral piece 152C is connected to the base portion 102) of the inner peripheral piece 152C.

The outer peripheral piece 151C is configured to be swingable about the second bent portion 157. In a case where the outer peripheral piece 151C is located on the flat surface inclined in the direction D13, when the optical fiber X held in the space SC is pulled along the same direction (an arrow A in FIG. 21) as an inclination direction of the outer peripheral piece 151C, the optical fiber X is not caught by the outer peripheral piece 151C. Therefore, the operator can easily extract the optical fiber X. On the other hand, when the optical fiber X is pulled in a direction opposite to the inclination direction of the outer peripheral piece 151C, the optical fiber X is caught by the outer peripheral piece 151C.

Therefore, the operator cannot easily extract the optical fiber X. As described above, since the outer peripheral piece 151C in this example is configured to restrict an extracting direction of the optical fiber X, the operator can easily recognize an appropriate extracting direction of the optical fiber X.

Although the present invention has been described in detail with reference to specific embodiments, it will be apparent to those skilled in the art that various changes and modifications can be made without departing from the spirit and scope of the present invention. The numbers, positions, shapes, and the like of components described above are not limited to the embodiments described above and can be changed to suitable numbers, positions, shapes, and the like on a premise that the present invention is achieved.

(Appendix)

For example, the present invention includes the following embodiments.

(Appendix 1)

A package for an optical fiber, the package including:
a base portion;
a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions; and
a mounting portion to which the connector of the optical fiber is to be mounted, in which
the mounting portion includes a pair of gripping portions that protrude in a first direction from the flat surface of the base portion and are arranged to face each other in a second direction intersecting the first direction.

(Appendix 2)

A package for an optical fiber, the package including:
a base portion;
a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions; and
a mounting portion to which the connector of the optical fiber is to be mounted, in which
a surface of a second end portion facing the other gripping portion is curved when a gripping portion is viewed from a direction perpendicular to the flat surface of the base portion.

REFERENCE SIGNS LIST 1A, 101A, 101B: Package
2, 102: Base portion 21, 121: Flat surface
22, 122: Outer periphery
23, 123: Guide wall
3, 103: Protruding portion
3E: Front end
31: Outer peripheral surface
4, 104: Mounting portion
41, 141: First mounting portion
411: Gripping portion
411A: Convex portion
411B: Connecting portion
411C: Non-connecting portion
411E1: Front end portion
411E2: First end portion
411E3: Second end portion
42, 142: Second mounting portion
43: Third mounting portion
44: Fourth mounting portion
5, 105, 105C: Fall-off preventing portion
51: Extending portion
6: Connecting portion
6E1: Front end portion
6E2: Rear end portion
6S: Rear surface
61: Convex portion
61S: Outer peripheral surface
62: Concave portion
63: Projecting Portion
63S1: Front end surface
63S2: Rear end surface
63S: Inner peripheral surface
64: Rib
7: Central protruding portion
7E: Front end
8, 106: Multi-stacking jig
81, 161: Gripping portion
82: Shaft portion
82E: End portion
821: Inserting portion
83: Supporting portion
831: Placement surface
832: Surface
84: Contacting portion
841: Contact surface
9: Extending portion
131: First protruding portion
132: Second protruding portion
133: Outer peripheral surface
134: Inner peripheral surface
135: First connection surface
136: First upper surface
137: Second upper surface
138: Second connection surface
151, 151C: Outer peripheral piece
152, 152C: Inner peripheral piece
153, 153C: Continuous portion
154, 154C: Base end portion
155: First bent portion
156: Cut portion
157: Second bent portion
162: Inserting portion
X: Optical fiber
X1: First connector
X2: Second connector
X11, X21: Boot
C: Cap
P: Step
S, SC: Space
D1: Direction
D2: Direction
D10: Interval
D11: Direction
D12: Direction
D13: Direction
D20: Interval
IL1: Line
IL2: Line
L1: First axis
L2: Second axis

The invention claimed is:
1. A package for an optical fiber comprising:
a base portion;
a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions;
a mounting portion to which the connector of the optical fiber is to be mounted;
a plurality of fall-off preventing portions that are formed integrally with the base portion and capable of restricting a position of the optical fiber to be wound over the plurality of protruding portions; and
a plurality of connecting portions that protrude from the flat surface of the base portion, wherein
the connecting portion includes a convex portion at a front end portion in a direction in which the connecting portion protrudes, and has a concave portion recessed forward from a rear surface at a rear end portion in the direction in which the connecting portion protrudes.
2. The package for an optical fiber according to claim 1, wherein
the mounting portion protrudes in a first direction from the flat surface of the base portion and includes a pair of gripping portions arranged to face each other in a second direction intersecting the first direction.
3. The package for an optical fiber according to claim 2, wherein
at least one gripping portion of the pair of gripping portions includes a convex portion at an end portion thereof in the first direction, the convex portion protruding toward the other gripping portion of the pair of gripping portions.
4. The package for an optical fiber according to claim 2, wherein
each of the pair of gripping portions includes a first end portion in a third direction intersecting the first direction and the second direction,
each of the pair of gripping portions includes a non-connecting portion that is not connected to the base portion, and
an interval between the non-connecting portions of the pair of gripping portions in the second direction decreases toward the first end portions.
5. The package for an optical fiber according to claim 2, wherein
each of the pair of gripping portions includes a second end portion in the third direction intersecting the first direction and the second direction, and
an interval between the gripping portions at the second end portions in the second direction increases toward the second end portions.

6. The package for an optical fiber according to claim 5, wherein
a surface of the second end portion facing the other gripping portion is curved when the gripping portion is viewed from a direction perpendicular to the flat surface of the base portion.

7. The package for an optical fiber according to claim 1, wherein
the connecting portion includes a plurality of ribs provided in the concave portion.

8. The package for an optical fiber according to claim 1, wherein
the connecting portions include three connecting portions, and
the connecting portions are arranged at positions corresponding to vertices of a triangle including a center of the base portion therein when viewed from the direction perpendicular to the flat surface of the base portion.

9. The package for an optical fiber according to claim 1, wherein
the fall-off preventing portion includes a second extending portion extending in the direction along the flat surface of the base portion.

10. The package for an optical fiber according to claim 1, wherein
the optical fiber includes a first connector and a second connector at respective end portions thereof,
the mounting portion includes a first mounting portion to which the first connector is mountable and a second mounting portion to which the second connector is mountable, and
a first axis, which is a longitudinal direction of the first connector to be mounted to the first mounting portion, and a second axis, which is a longitudinal direction of the second connector to be mounted to the second mounting portion, intersect each other when viewed from the direction perpendicular to the flat surface of the base portion.

11. The package for an optical fiber according to claim 10, wherein
the mounting portion further includes a third mounting portion to which the first connector is mountable and a fourth mounting portion to which the second connector is mountable, and
the third axis, which is the longitudinal direction of the first connector to be mounted to the third mounting portion, and the fourth axis, which is the longitudinal direction of the second connector to be mounted to the fourth mounting portion, intersect each other when viewed from the direction perpendicular to the flat surface of the base portion.

12. The package for an optical fiber according to claim 1, wherein
the base portion, the protruding portions, the mounting portion, and the fall-off preventing portions are integrally formed.

13. The package for an optical fiber according to claim 1, wherein
the base portion, the protruding portions, the mounting portion, the fall-off preventing portions, and the connecting portions are integrally formed.

14. The package for an optical fiber according to claim 1, wherein
a non-circular hole is formed near the center of the base portion.

15. The package for an optical fiber according to claim 1, wherein
the fall-off preventing portion restricts a position of the optical fiber in the direction perpendicular to the flat surface of the base portion, and in a direction perpendicular to a longitudinal direction of the optical fiber to be wound over the plurality of protruding portions and the direction perpendicular to the flat surface of the base portion.

16. The package for an optical fiber according to claim 1, wherein
the fall-off preventing portion is disposed between the protruding portions adjacent to each other in the longitudinal direction of the optical fiber.

17. The package for an optical fiber according to claim 1, wherein
the fall-off preventing portion includes an outer peripheral piece located near the outer periphery of the base portion, an inner peripheral piece located closer to the center of the base portion than the outer peripheral piece, and a continuous portion connecting the outer peripheral piece and the inner peripheral piece,
the fall-off preventing portion is configured to hold the optical fiber in a space surrounded by the inner peripheral piece, the continuous portion, and the outer peripheral piece,
the inner peripheral piece is connected to the base portion, and
the outer peripheral piece is not connected to the base portion.

18. The package for an optical fiber according to claim 17, wherein the inner peripheral piece is inclined with respect to the flat surface of the base portion.

19. The package for an optical fiber according to claim 1, wherein
the protruding portion includes an outer peripheral surface located near the outer periphery of the base portion, and an inner peripheral surface located closer to the center of the base portion than the outer peripheral surface,
the inner peripheral surface is perpendicular to the flat surface of the base portion, and
the outer peripheral surface is inclined with respect to the flat surface of the base portion.

20. A package product comprising:
an optical fiber including a connector mounted to at least one end thereof; and
the package for an optical fiber according to claim 1, wherein
the optical fiber is stored in the package, and the connector is mounted to the mounting portion.

21. The package product according to claim 20, wherein
the optical fiber includes a first connector and a second connector at respective end portions thereof,
the mounting portion includes the first mounting portion to which the first connector is mountable and the second mounting portion to which the second connector is mountable, and
a boot of the first connector mounted to the first mounting portion and a boot of the second connector mounted to the second mounting portion intersect each other when viewed from the direction perpendicular to the flat surface of the base portion.

22. The package for an optical fiber according to claim 1, further comprising:
a central protruding portion that protrudes from the flat surface of the base portion, is disposed closer to the center of the base portion than the plurality of protruding portions, and is configured so that a remaining portion of the optical fiber wound around the plurality of protruding portions is wound along a part of an outer periphery of the central protruding portion; and
a first extending portion that extends from the central protruding portion in an extending direction toward one of the connecting portions.

23. A package for an optical fiber comprising:
a base portion;
a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions;
a mounting portion to which the connector of the optical fiber is to be mounted;
a plurality of fall-off preventing portions that are formed integrally with the base portion and capable of restricting a position of the optical fiber to be wound over the plurality of protruding portions;
a central protruding portion that protrudes from the flat surface of the base portion, is disposed closer to the center of the base portion than the plurality of protruding portions, and is configured so that a remaining portion of the optical fiber wound around the plurality of protruding portions is wound along a part of an outer periphery of the central protruding portion; and
a first extending portion that extends from the central protruding portion in an extending direction along the flat surface of the base portion.

24. The package for an optical fiber according to claim 23, wherein
the mounting portion protrudes in a first direction from the flat surface of the base portion and includes a pair of gripping portions arranged to face each other in a second direction intersecting the first direction.

25. The package for an optical fiber according to claim 24, wherein
at least one gripping portion of the pair of gripping portions includes a convex portion at an end portion thereof in the first direction, the convex portion protruding toward the other gripping portion of the pair of gripping portions.

26. The package for an optical fiber according to claim 24, wherein
each of the pair of gripping portions includes a first end portion in a third direction intersecting the first direction and the second direction,
each of the pair of gripping portions includes a non-connecting portion that is not connected to the base portion, and
an interval between the non-connecting portions of the pair of gripping portions in the second direction decreases toward the first end portions.

27. The package for an optical fiber according to claim 24, wherein
each of the pair of gripping portions includes a second end portion in the third direction intersecting the first direction and the second direction, and
an interval between the gripping portions at the second end portions in the second direction increases toward the second end portions.

28. The package for an optical fiber according to claim 27, wherein
a surface of the second end portion facing the other gripping portion is curved when the gripping portion is viewed from a direction perpendicular to the flat surface of the base portion.

29. The package for an optical fiber according to claim 23, wherein
the connecting portion includes a plurality of ribs provided in the concave portion.

30. The package for an optical fiber according to claim 23, wherein
the connecting portions include three connecting portions, and
the connecting portions are arranged at positions corresponding to vertices of a triangle including a center of the base portion therein when viewed from the direction perpendicular to the flat surface of the base portion.

31. The package for an optical fiber according to claim 23, wherein
the fall-off preventing portion includes a second extending portion extending in the direction along the flat surface of the base portion.

32. The package for an optical fiber according to claim 23, wherein
the optical fiber includes a first connector and a second connector at respective end portions thereof,
the mounting portion includes a first mounting portion to which the first connector is mountable and a second mounting portion to which the second connector is mountable, and
a first axis, which is a longitudinal direction of the first connector to be mounted to the first mounting portion, and a second axis, which is a longitudinal direction of the second connector to be mounted to the second mounting portion, intersect each other when viewed from the direction perpendicular to the flat surface of the base portion.

33. The package for an optical fiber according to claim 32, wherein
the mounting portion further includes a third mounting portion to which the first connector is mountable and a fourth mounting portion to which the second connector is mountable, and
the third axis, which is the longitudinal direction of the first connector to be mounted to the third mounting portion, and the fourth axis, which is the longitudinal direction of the second connector to be mounted to the fourth mounting portion, intersect each other when viewed from the direction perpendicular to the flat surface of the base portion.

34. The package for an optical fiber according to claim 23, wherein
the base portion, the protruding portions, the mounting portion, and the fall-off preventing portions are integrally formed.

35. The package for an optical fiber according to claim 23, wherein
a non-circular hole is formed near the center of the base portion.

36. A package product comprising:
an optical fiber including a connector mounted to at least one end thereof; and
the package for an optical fiber according to claim 23, wherein
the optical fiber is stored in the package, and the connector is mounted to the mounting portion.

37. The package product according to claim 36, wherein
the optical fiber includes a first connector and a second connector at respective end portions thereof, the mounting portion includes the first mounting portion to which the first connector is mountable and the second mounting portion to which the second connector is mountable, and a boot of the first connector mounted to the first mounting portion and a boot of the second connector mounted to the second mounting portion intersect each other when viewed from the direction perpendicular to the flat surface of the base portion.

38. The package for an optical fiber according to claim 23, further comprising a third extending portion that extends from the central protruding portion in an opposite direction opposite to the extending direction of the first extending portion.

39. The package for an optical fiber according to claim 38, wherein the first and third extending portions extends in a longitudinal direction of the base portion.

40. The package for an optical fiber according to claim 23, wherein the base portion includes a hole under the first extending portion.

41. A package for an optical fiber comprising:

a base portion;

a plurality of protruding portions that protrude from a flat surface of the base portion, are arranged along an outer periphery of the base portion, and are configured so that an optical fiber including a connector mounted to at least one end thereof is wound along a part of an outer periphery of each of the protruding portions;

a mounting portion to which the connector of the optical fiber is to be mounted; and a plurality of fall-off preventing portions that are formed integrally with the base portion and capable of restricting a position of the optical fiber to be wound over the plurality of protruding portions, wherein:

the fall-off preventing portion includes an outer peripheral piece located near the outer periphery of the base portion, an inner peripheral piece located closer to the center of the base portion than the outer peripheral piece, and a continuous portion connecting the outer peripheral piece and the inner peripheral piece, the fall-off preventing portion is configured to hold the optical fiber in a space surrounded by the inner peripheral piece, the continuous portion, and the outer peripheral piece, the inner peripheral piece is connected to the base portion, the outer peripheral piece is not connected to the base portion, and a length of the outer peripheral piece in the direction perpendicular to the longitudinal direction of the optical fiber to be wound over the plurality of protruding portions and the direction perpendicular to the flat surface of the base portion is shorter than a length of the inner peripheral piece connected to the base portion.

42. A package product comprising:

an optical fiber including a connector mounted to at least one end thereof; and the package for an optical fiber according to claim 41, wherein the optical fiber is stored in the package, and the connector is mounted to the mounting portion.

43. The package product according to claim 42, wherein the optical fiber includes a first connector and a second connector at respective end portions thereof, the mounting portion includes the first mounting portion to which the first connector is mountable and the second mounting portion to which the second connector is mountable, and a boot of the first connector mounted to the first mounting portion and a boot of the second connector mounted to the second mounting portion intersect each other when viewed from the direction perpendicular to the flat surface of the base portion.

\* \* \* \* \*